US008391672B2

(12) United States Patent
Ikeda et al.

(10) Patent No.: US 8,391,672 B2
(45) Date of Patent: Mar. 5, 2013

(54) RECORDING MEDIUM, REPRODUCTION DEVICE, PROGRAM, AND REPRODUCTION METHOD

(75) Inventors: Wataru Ikeda, Osaka (JP); Tomoyuki Okada, Nara (JP)

(73) Assignee: Panasonic Corporation, Osaka (JP)

( * ) Notice: Subject to any disclaimer, the term of this patent is extended or adjusted under 35 U.S.C. 154(b) by 1433 days.

(21) Appl. No.: 11/835,291

(22) Filed: Aug. 7, 2007

(65) Prior Publication Data

US 2008/0002946 A1 Jan. 3, 2008

Related U.S. Application Data

(62) Division of application No. 11/579,223, filed as application No. PCT/JP2005/010145 on Feb. 6, 2005.

(30) Foreign Application Priority Data

Feb. 6, 2004 (JP) ................................ 2004-164203

(51) Int. Cl.
*H04N 9/80* (2006.01)
*H04N 5/917* (2006.01)
*H04N 5/93* (2006.01)

(52) U.S. Cl. ........ 386/241; 386/239; 386/248; 386/331; 386/353; 386/356

(58) Field of Classification Search .......... 386/239–248, 386/326–341, 353–357
See application file for complete search history.

(56) References Cited

U.S. PATENT DOCUMENTS 5,970,205 A 10/1999 Nakamura et al.
6,061,496 A 5/2000 Nakamura et al.
6,369,835 B1 4/2002 Lin
6,611,655 B1 * 8/2003 Murase et al. ................ 386/338
6,618,550 B1 * 9/2003 Ando et al. .................. 386/240
6,931,071 B2 8/2005 Haddad et al.
6,950,604 B1 9/2005 Kato et al.
7,616,863 B2 11/2009 Ando et al.
2002/0135607 A1 9/2002 Kato et al.
2002/0168012 A1 * 11/2002 Ramaswamy ........... 375/240.29
2003/0219227 A1 11/2003 Otala et al.
2004/0001694 A1 1/2004 Evans et al.
2004/0001695 A1 1/2004 Evans et al.
2004/0047591 A1 3/2004 Seo et al.
2004/0071354 A1 4/2004 Adachi et al.
2004/0156623 A1 8/2004 Kato et al.
2005/0025461 A1 2/2005 Kato et al.
2005/0036519 A1 2/2005 Balakrishnan et al.
2005/0175098 A1 * 8/2005 Narasimhan et al. .... 375/240.12
2006/0031749 A1 * 2/2006 Schramm et al. .......... 715/500.1
2006/0045481 A1 3/2006 Yahata et al.
2006/0050088 A1 3/2006 Yahata et al.

(Continued)

FOREIGN PATENT DOCUMENTS

EP 0 903 738 A2 3/1999
EP 0 982 725 3/2000

(Continued)

*Primary Examiner* — Thai Tran
*Assistant Examiner* — Hung Dang
(74) *Attorney, Agent, or Firm* — Panasonic Patent Center

(57) ABSTRACT

Video streams and an entry map are recorded on a BD-ROM in association with each other. The video stream constituting a slide show includes a plurality of IDR pictures. The entry map (EP_map) associated with the IDR pictures indicates an entry time (PTS_EP_start) of each IDR picture included in the video stream in association with an entry point (SPN_EP_start). Application_type indicates that entry information of each of pieces of picture data constituting the video stream exists in the EP_map and each piece of picture data is to be decoded independently. When a time-based slideshow has been identified all of the pieces of picture data are repeatedly pointed to by entries in the entry map.

6 Claims, 33 Drawing Sheets

U.S. PATENT DOCUMENTS

| | | | | |
|---|---|---|---|---|
| 2006/0153531 | A1 | 7/2006 | Kanegae et al. | |
| 2006/0153532 | A1 | 7/2006 | McCrossan et al. | |
| 2007/0077029 | A1 | 4/2007 | Yahata et al. | |
| 2007/0077030 | A1 | 4/2007 | Yahata et al. | |
| 2007/0088752 | A1 * | 4/2007 | Seo et al. | 707/104.1 |
| 2007/0091121 | A1 | 4/2007 | Yahata et al. | |
| 2007/0172202 | A1 | 7/2007 | Yahata et al. | |
| 2008/0238940 | A1 | 10/2008 | Yahata et al. | |
| 2009/0214175 | A1 | 8/2009 | McCrossan et al. | |
| 2009/0220211 | A1 | 9/2009 | McCrossan et al. | |
| 2009/0285309 | A1 | 11/2009 | Wiegand | |
| 2010/0027971 | A1 | 2/2010 | Toma et al. | |
| 2010/0046610 | A1 | 2/2010 | Toma et al. | |
| 2011/0200306 | A1 | 8/2011 | Yahata et al. | |

FOREIGN PATENT DOCUMENTS

| | | | |
|---|---|---|---|
| EP | 0 994 480 | A1 | 4/2000 |
| EP | 1 102 270 | A1 | 5/2001 |
| EP | 1 408 507 | A2 | 4/2004 |
| EP | 1 489 841 | | 12/2004 |
| JP | 7-123356 | | 5/1995 |
| JP | 7-284065 | | 10/1995 |
| JP | 2000-228656 | | 8/2000 |
| JP | 2001-169247 | | 6/2001 |
| JP | 2002-158972 | | 5/2002 |
| JP | 2002-300520 | | 10/2002 |
| JP | 2002-330402 | | 11/2002 |
| JP | 2004-40791 | | 2/2004 |
| JP | 2004-128766 | | 4/2004 |
| KR | 2000-0017534 | | 3/2000 |
| WO | 03/067594 | | 8/2003 |
| WO | 2004/023484 | | 3/2004 |
| WO | 2004-077826 | | 9/2004 |

* cited by examiner

FIG. 14

EP_Low(0) ~ (Nf-1)

| | | |
|---|---|---|
| ⋮ | ⋮ | ⋮ |
| is_angle_change_point (i)=1 | PTS_EP_Low (i)=LOWER BIT OF t1 | SPN_EP_Low (i)=LOWER BIT OF n1 |
| is_angle_change_point (i+1)=0 | PTS_EP_Low (i+1)=LOWER BIT OF t3 | SPN_EP_Low (i+1)=LOWER BIT OF n3 |
| is_angle_change_point (i+2)=1 | PTS_EP_Low (i+2)=LOWER BIT OF t5 | SPN_EP_Low (i+2)=LOWER BIT OF n5 |
| is_angle_change_point (i+3)=0 | PTS_EP_Low (i+3)=LOWER BIT OF t7 | SPN_EP_Low (i+3)=LOWER BIT OF n7 |
| ⋮ | ⋮ | ⋮ |
| is_angle_change_point (j)=0 | PTS_EP_Low (j) | SPN_EP_Low (j) |
| is_angle_change_point (j+1)=0 | PTS_EP_Low (j+1) | SPN_EP_Low (j+1) |
| is_angle_change_point (j+2)=0 | PTS_EP_Low (j+2) | SPN_EP_Low (j+2) |
| ⋮ | ⋮ | ⋮ |
| is_angle_change_point (k)=0 | PTS_EP_Low (k) | SPN_EP_Low (k) |
| is_angle_change_point (k+1)=0 | PTS_EP_Low (k+1) | SPN_EP_Low (k+1) |
| is_angle_change_point (k+2)=0 | PTS_EP_Low (k+2) | SPN_EP_Low (k+2) |
| ⋮ | ⋮ | ⋮ |

EP_High(0) ~ (Nc-1)

| | | |
|---|---|---|
| ⋮ | ⋮ | ⋮ |
| ref_to_EP_Low_id(A) =REFERENCE VALUE TO EP_Low_(I) | PTS_EP_High(A) =COMMON HIGHER BIT OF t1, t3, t5, t7 | SPN_EP_High_(A) =COMMON HIGHER BIT OF n1, n3, n5, n7 |
| ref_to_EP_Low_id (A+1) | PTS_EP_High(A+1) | SPN_EP_High_(A+1) |
| ref_to_EP_Low_id (A+2) | PTS_EP_High(A+2) | SPN_EP_High_(A+2) |
| ⋮ | ⋮ | ⋮ |

DATA STRUCTURE OF ICS (PTS=tx)

RECORDING MEDIUM, REPRODUCTION DEVICE, PROGRAM, AND REPRODUCTION METHOD

RELATED APPLICATIONS

This is a Divisional Application of the U.S. patent application Ser. No. 11/579,223 filed Nov. 29, 2007 which is the U.S. National Phase of PCT Application No. PCT/JP2005/010145 filed on Feb. 6, 2006.

TECHNICAL FIELD

The present invention relates to the field of a random access technique.

BACKGROUND ART

A random access technique is a technique for converting a point on a time line of a digital stream to a recording position on the digital stream, and starting playback of the digital stream from the recording position. This is an essential technical basis for playing back digital streams recorded on a recording medium, such as a BD-ROM or a DVD-Video.

Digital streams are coded by a variable-length encoding method, such as MPEG2-Video or MPEG4-AVC, and the amount of information included in each frame is different. Therefore, to perform the above-described conversion for the random access, it is necessary to refer to an entry map. The entry map indicates a plurality of entry times on a time line of a digital stream in one-to-one correspondence with a plurality of entry points on the digital stream. If the time accuracy of the plurality of entry times on the entry map is one second, it is possible to efficiently perform the random access in time accuracy of one second.

For the random access targeting a video stream, it is necessary to search for an I (Intra) picture positioned at the beginning of a GOP. A data structure supporting the search for the I picture is disclosed by a prior art below:

Patent Document 1: JP Patent Application Publication No. 2000-228656.

DISCLOSURE OF THE INVENTION

In addition to a movie application, a slide show also is an application that uses a time line. A slide show is composed of a plurality of still images, each of which is played back along a previously defined time line. Since the slide show also has a time line for playback, it is possible to find a recording position on a stream based on a time point on a time line and perform a playback from the recording position, by indicating a plurality of entry times in one-to-one correspondence with entry points.

However, since a slide show is composed of a plurality of still images, an accuracy required for the random access to the slide show is higher than that to a movie. Here, the random access with a high accuracy is a random access performed in units of pictures, e.g., accessing to the next picture, to the picture ten pictures ahead, and so on. The time accuracy of the entry map for a video stream is approximately one second, and each of the intervals having a length of one second includes twenty to thirty pictures. Therefore, if realizing a high-accuracy random access performed in units of pictures by using the above-described entry map, it is necessary to perform analysis of the stream in addition to the reference to the entry map.

Here, the "analysis of the stream" means the following processing procedures: a picture header is extracted from an entry point described in the entry map; a picture size is read from the header; the recording position of the next picture is specified based on the picture size; and these procedures are repeated to reach to the recording position of the desired picture. Such an analysis requires frequent accesses to the stream. Therefore, it takes considerably long time to read a picture only three or five pictures ahead of the entry point. Since it takes a long time to perform the random access in units of pictures, there is a problem that it is difficult for developers to add, to the slide show, a function with satisfying usability of displaying, for example, the previous picture or the next picture, or displaying a picture positioned ten pictures ahead or behind.

The object of the present invention is to provide a recording medium capable of performing a high-speed random access in a slide show.

Means for Solving the Problem

To fulfill the above-described object, the present invention provides a recording medium having recorded thereon a video stream and stream management information, wherein the video stream includes a plurality of pieces of picture data, the stream management information includes an entry map and a flag that indicates one of application types, the entry map indicates an entry address of each piece of picture data in correspondence with a playback start time thereof, the application types include a movie and a time-based slideshow, and if a value indicating the time-based slideshow has been set to the flag, all the pieces of picture data are respectively pointed to by entries included in the entry map.

Advantageous Effects of the Present Invention

If a value indicating the time-based slideshow has been set to the flag, all the pieces of picture data are respectively pointed to by entries included in the entry map. Therefore, it is possible to realize a random access performed in units of pictures, e.g., accessing to the next picture, to the picture three pictures ahead, without analyzing the video stream.

The stream management information further includes a flag for indicating that entry addresses of all the pieces of picture data included in the video stream are pointed to by the entry map.

Even if the data structure of the entry map for the slide show is apparently the same as the data structure of the entry map for moving pictures, the playback device is required to perform the random access in units of pictures only when the flag indicates the above, while performing playback control that is the same as that performed for playing moving pictures. The playback device can realize the random access performed in units of pictures with keeping the compatibility with playback of moving pictures. As a result, it is possible to prompt the use of playback devices having functions of playing back both moving pictures and a slide show.

BRIEF DESCRIPTION OF THE DRAWINGS

FIG. 14 illustrates pairs of EP_Low and EP_High values representing the PTS_EP_start and the SPN_EP_start of entry points #1-#5 illustrated in FIG. 13;

DESCRIPTION OF REFERENCE NUMERALS

1 BD Drive
2 Arrival Time Clock Counter
3 Source De-Packetizer
4 PID Filter 4
5 Transport Buffer 5
6 Multiplexed Buffer 6
7 Coded Picture Buffer 7
8 Video Decoder 8
10 Decoded Picture Buffer 10
11 Video Plane 11
12 Transport Buffer 12
13 Coded Data Buffer 13
14 Stream Graphics Processor 14
15 Object Buffer 15
16 Composition Buffer 16
17 Composition Controller 17
18 Presentation Graphics Plane 18
19 CLUT Unit 19
20 Transport Buffer 20
21 Coded Data Buffer 21
22 Stream Graphics Processor 22
23 Object Buffer 23
24 Composition Buffer 24
25 Composition Controller 25
26 Interactive Graphics Plane 26
27 CLUT Unit 27
28 Compositor 28
29 Compositor 29
30 Switch 30
31 Network Device 31
32 Local Storage 32
33 Arrival Time Clock Counter 33
34 Source De-Packetizer 34
35 PID Filter
36 Switch
37 Transport Buffer
38 Elementary Buffer
39 Audio Decoder
40 Transport Buffer
41 Buffer
42 Text Subtitle Decoder
43 Scenario Memory
44 Controller
46 PSR Set
100 BD-ROM
200 Playback Device
300 Remote Controller
400 television set

BEST MODE FOR CARRYING OUT THE INVENTION

First Embodiment

Figure 1:
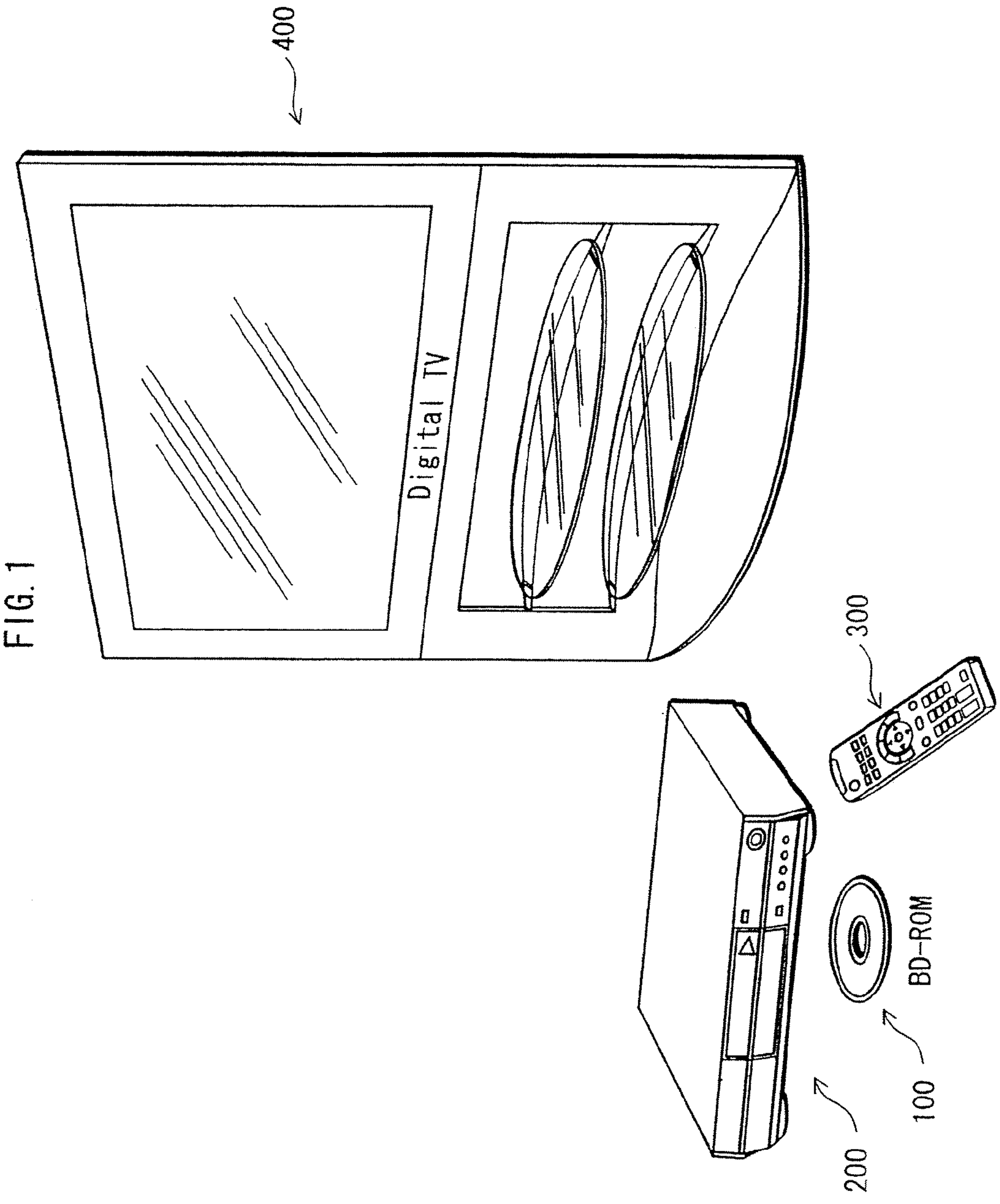
FIG. 1 illustrates a form of an act of using a recording medium according to the present invention.

The following describes an embodiment of a recording medium according to the present invention. First of all, among various acts of practicing a recording medium of the present invention, an act of using is described. FIG. 1 illustrates a form of using the recording medium according to the present invention. In FIG. 1, a BD-ROM 100 is the recording medium according to the present invention. The BD-ROM 100 is used to supply a movie to a home theater system composed of a playback device 200, a remote controller 300, and a television set 400. This concludes the description of the act of using the recording medium of the present invention.

Figure 2:
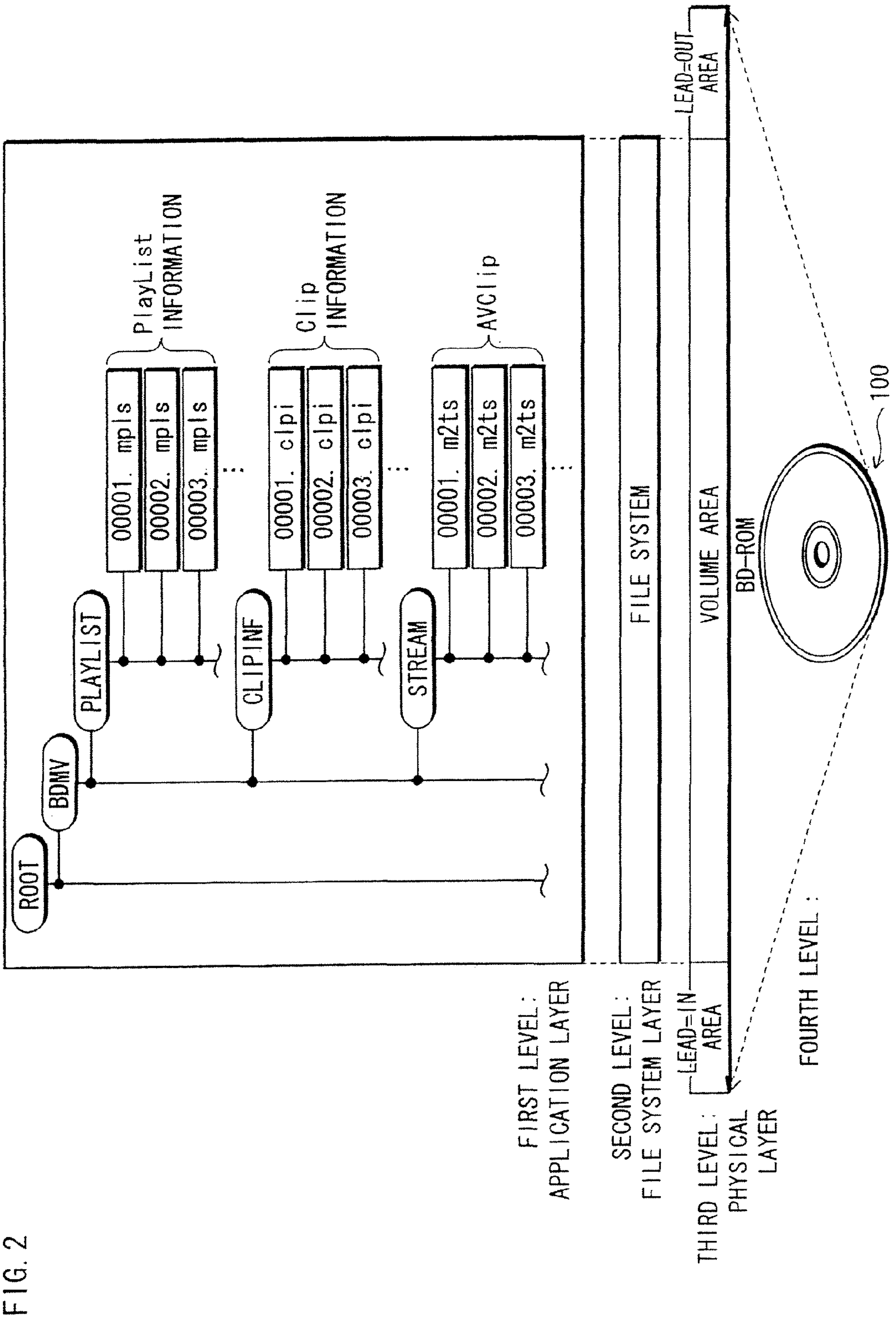
FIG. 2 is illustrates the internal structure of a BD-ROM.

Next, among various acts of practicing a recording medium of the present invention, an act of producing is described. The recording medium according to the present invention can be put in practice by improvement of an application layer of the BD-ROM. FIG. 2 illustrates the internal structure of the BD-ROM.

In the figure, the BD-ROM is illustrated on the fourth level, and the track of the BD-ROM is illustrated on the third level. In the figure, the track is laterally stretched out, although the track in practice spirals outwards from the center of the BD-ROM. The track is composed of a lead-in area, a volume area, and a lead-out area. The volume area has a layer model of a physical layer, a file system layer, and an application layer. The first level illustrates, in a directory structure, a format of the application layer (application format) of the BD-ROM. As illustrated on the first level, the BD-ROM has a ROOT directory, and the ROOT directory has a BDMV directory.

The BDMV directory has three subdirectories called a PLAYLIST directory, a CLIPINF directory, and a STREAM directory.

The STREAM directory stores files with the extension ".m2ts" (e.g. files called 00001.m2ts, 00002.m2ts and 00003.m2ts) containing data constituting the main body of a digital stream.

The PLAYLIST subdirectory stores files with the extension ".mpls" (e.g. files called 00001.mpls, 00002.mpls and 00003.mpls).

The CLIPINF directory stores files with the extension ".clpi" (e.g. files called 00001.clpi, 00002.clpi and 00003.clpi).

<Structure of AV Clip>

Figure 3:
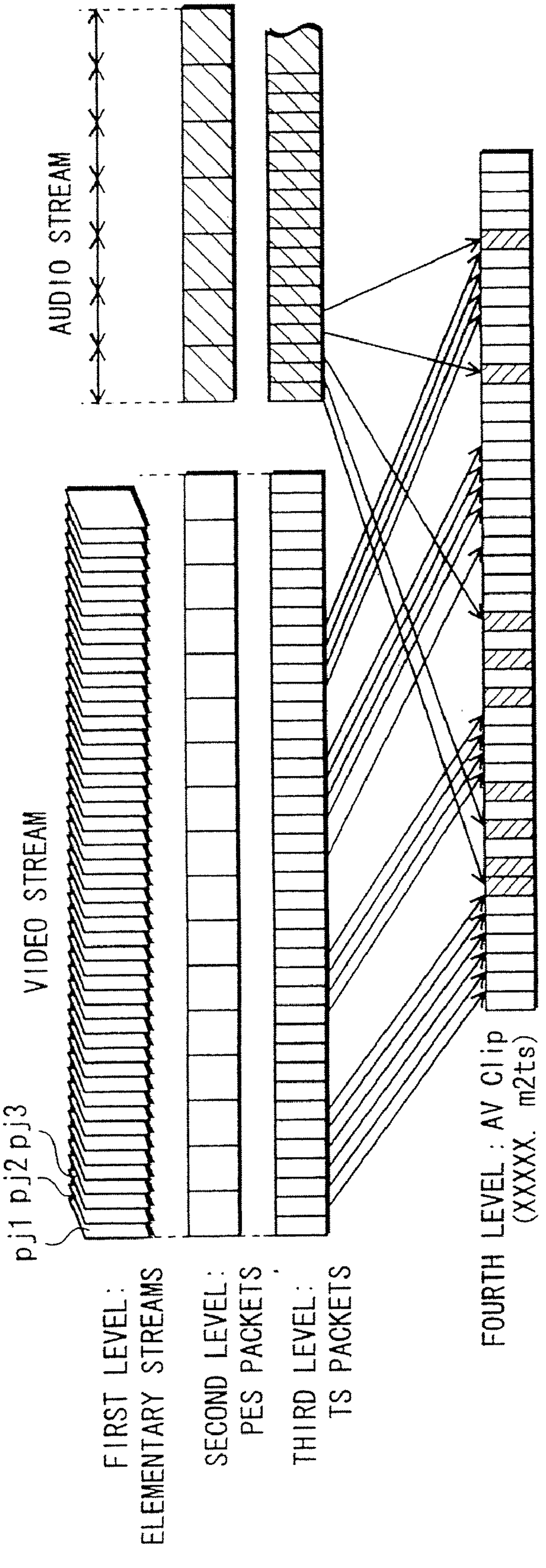
FIG. 3 schematically illustrates the structure of a file with the extension ".m2ts"

The following describes files with the extension ".m2ts". FIG. 3 schematically illustrates the structure of a file with the extension ".m2ts". Each file with the extension ".m2ts" (namely, 00001.m2ts, 00002.m2ts, 00003.m2ts, . . . ) contains an AV Clip. The AV Clip (illustrated on the fourth level) is created as follows. A video stream containing a plurality of video frames (pictures pj1, pj2, pj3, . . . ) and an audio stream containing a plurality of audio frames (both illustrated on the first level) are separately converted to PES packets (illustrated on the second level), and further converted to TS packets (illustrated on the third level). These TS packets of the video and audio streams are multiplexed to form the AV Clip.

Note that presentation graphics streams (PG streams) relating to subtitles and interactive graphics streams (IG streams) relating to interactions may also multiplexed to form the AV Clip. Further, subtitle data represented by text codes (text subtitle streams) may be recorded as the AV Clip.

Figure 4:
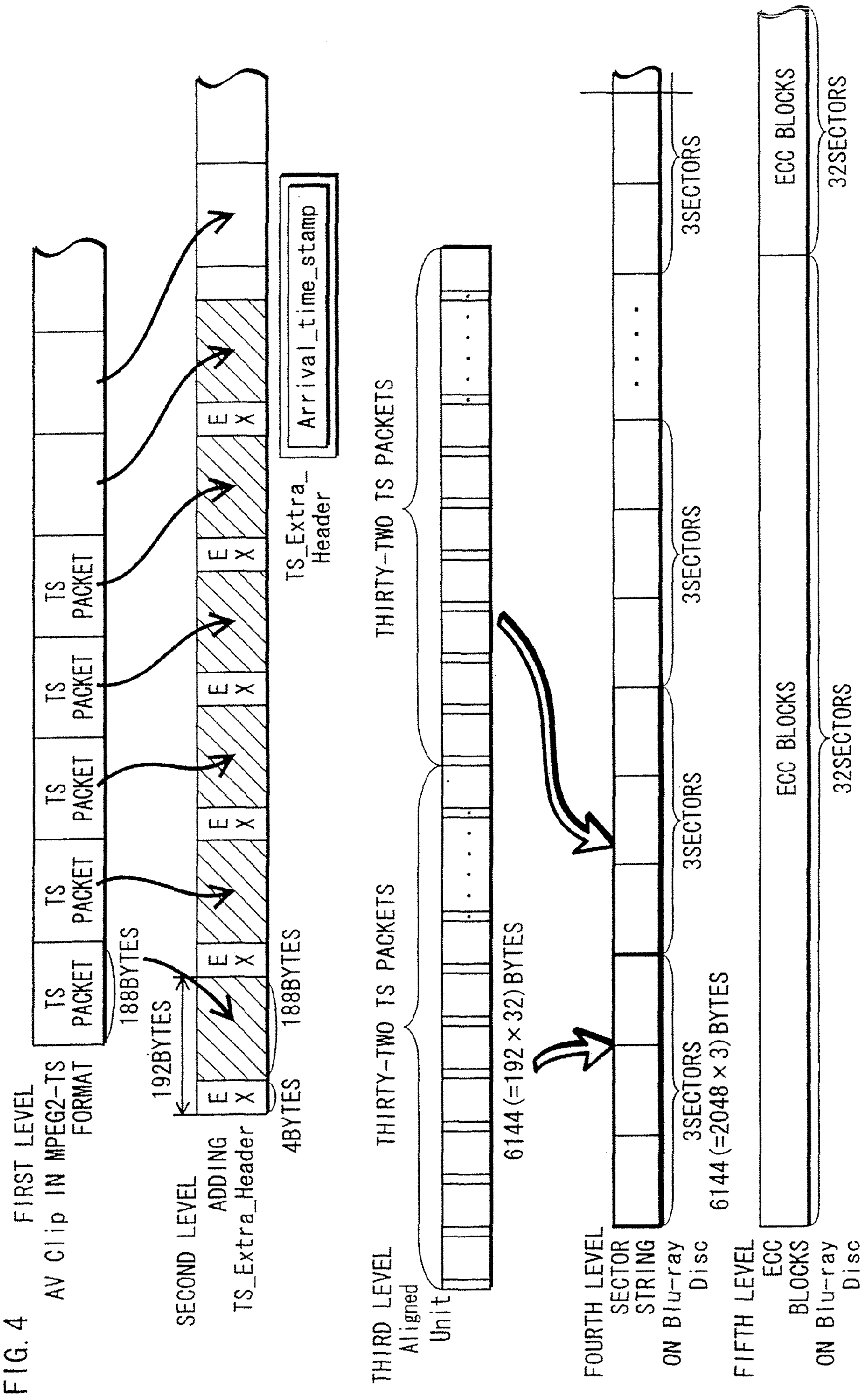
FIG. 4 illustrates the processes through which TS packets constituting an AV Clip are recorded onto the BD-ROM.

Next, a description is given of how a AV Clip, which is a digital stream of the MPEG2-TS format, is recorded on the BD-ROM. FIG. 4 illustrates the processes through which TS packets constituting the AV Clip are recorded onto the BD-ROM. In FIG. 4, the TS packets of the AV Clip are illustrated on the first level.

As illustrated on the second level, "TS_extra_header" (denoted as "EX" in the figure) is attached to each TS packet of the AV Clip.

The third and fourth levels illustrate the physical units of the BD-ROM in relation to the TS packets. As illustrated on the fourth level, the track on the BD-ROM is divided into a plurality of sectors. The TS packets with the TS_extra_header (hereinafter, simply "EX-TS packets") are divided into groups of 32 EX-TS packets, and each group is written into three sectors of the BD-ROM. Each group composed of 32 EX-TS packets amounts to 6,144 (=32×192) bytes, which is equal to the total size of three sectors (=2048×3). Each group of 32 EX-TS packets stored in three sectors of the BD-ROM is referred to as an "Aligned Unit". When data is recorded onto the BD-ROM, encryption of data is carried out in Aligned Units.

As illustrated on the fifth level, an error correction code is inserted every 32 sectors to constitute an ECC block. As long as accessing the BD-ROM in Aligned Units, a playback device is ensured to obtain a complete set of 32 EX-TS packets without missing any part. This completes the description of the processes of recording the AV Clip onto the BD-ROM.

<Video Stream>

The following describes the internal structure of a video stream. FIG. 5 illustrates the internal structure of a video stream. There are two types of video streams. One is a video stream used for presenting a movie, and the other is a video stream used for presenting a slide show. In this embodiment, the video streams of both types are commonly coded by MPEG4-AVC coding. In other words, they are common in the viewpoint of the coding method.

Figure 5A:
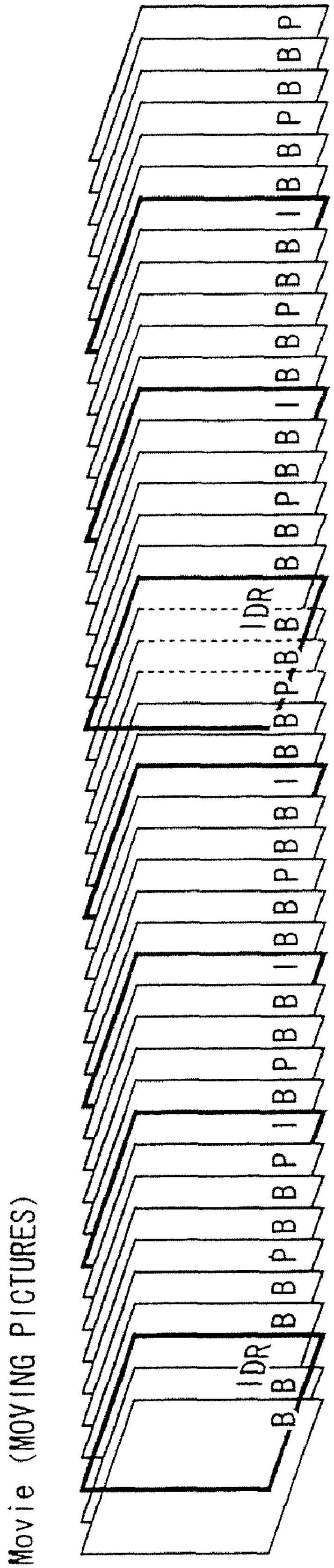
FIG. 5A illustrates the internal structure of a video stream used for presenting a movie.

FIG. 5A illustrates the internal structure of a video stream used for presenting a movie. The video stream illustrated in FIG. 5A is composed of a plurality of pictures aligned in the order of coding.

In the figure, the reference numerals "I", "P", and "B" denote an I picture, B picture, and P picture, respectively. There are two types of I pictures, one is an IDR picture and the other is a Non-IDR I picture. Non-IDR I pictures, P pictures, and B pictures are coded using correlation with other pictures. More specifically, a B picture is composed of Bidirectioanlly Predictive (B) slices. A P picture is composed of Predictive (P) slices. There are two types of B pictures, one is a reference B picture, and the other is a nonreference B picture.

In FIG. 5A, a Non-IDR I picture is denoted as "I", and an IDR picture is denoted as "IDR". The same denotations are used throughout the following descriptions. This concludes the description of the video stream used for presenting a movie.

Figure 6A:
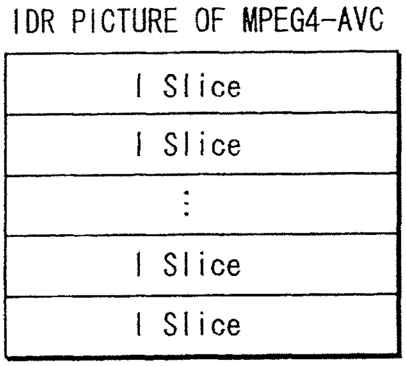
FIG. 6A illustrates the internal structure of an IDR picture.
Figure 6B:
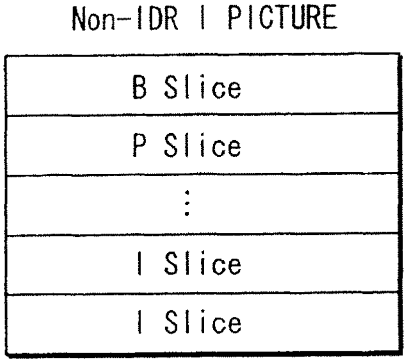
FIG. 6B illustrates the internal structure of a Non-IDR I picture and FIG. 6C illustrates the dependency relationship between the Non-IDR I picture and other pictures.
Figure 6C:
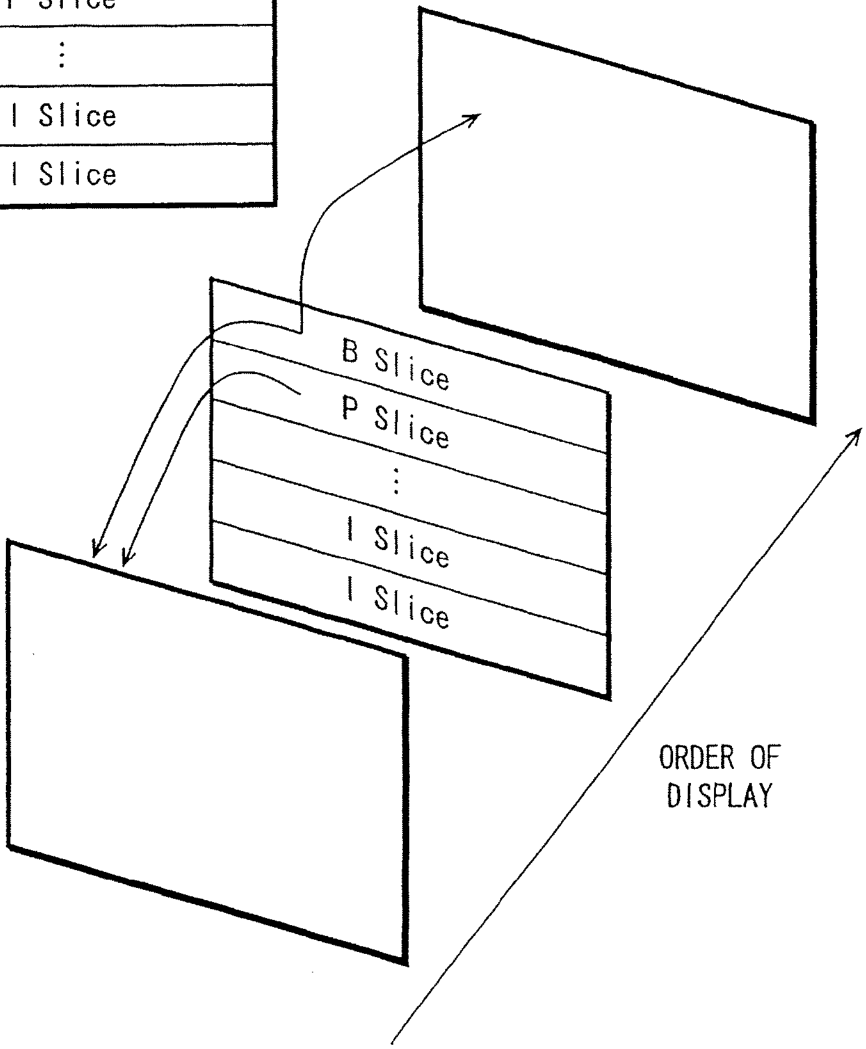

Next, the following describes the internal structures of an IDR picture and a Non-IDR I picture. FIG. 6A illustrates the internal structure of an IDR picture. As illustrated in the figure, the IDR picture is composed of a plurality of Intra-type slices. FIG. 6B illustrates the internal structure of a Non-IDR I picture. Different from the IDR picture composed solely of Intra-type slices, the Non-IDR I picture is composed of slices of Intra-type, P-type, and B-type. FIG. 6C illustrates the dependency relationship between the Non-IDR I picture and other pictures. A Non-IDR I picture may be composed of B and P slices and thus may have a dependency relationship with other pictures.

<Recording to BD-ROM>

Figure 7:
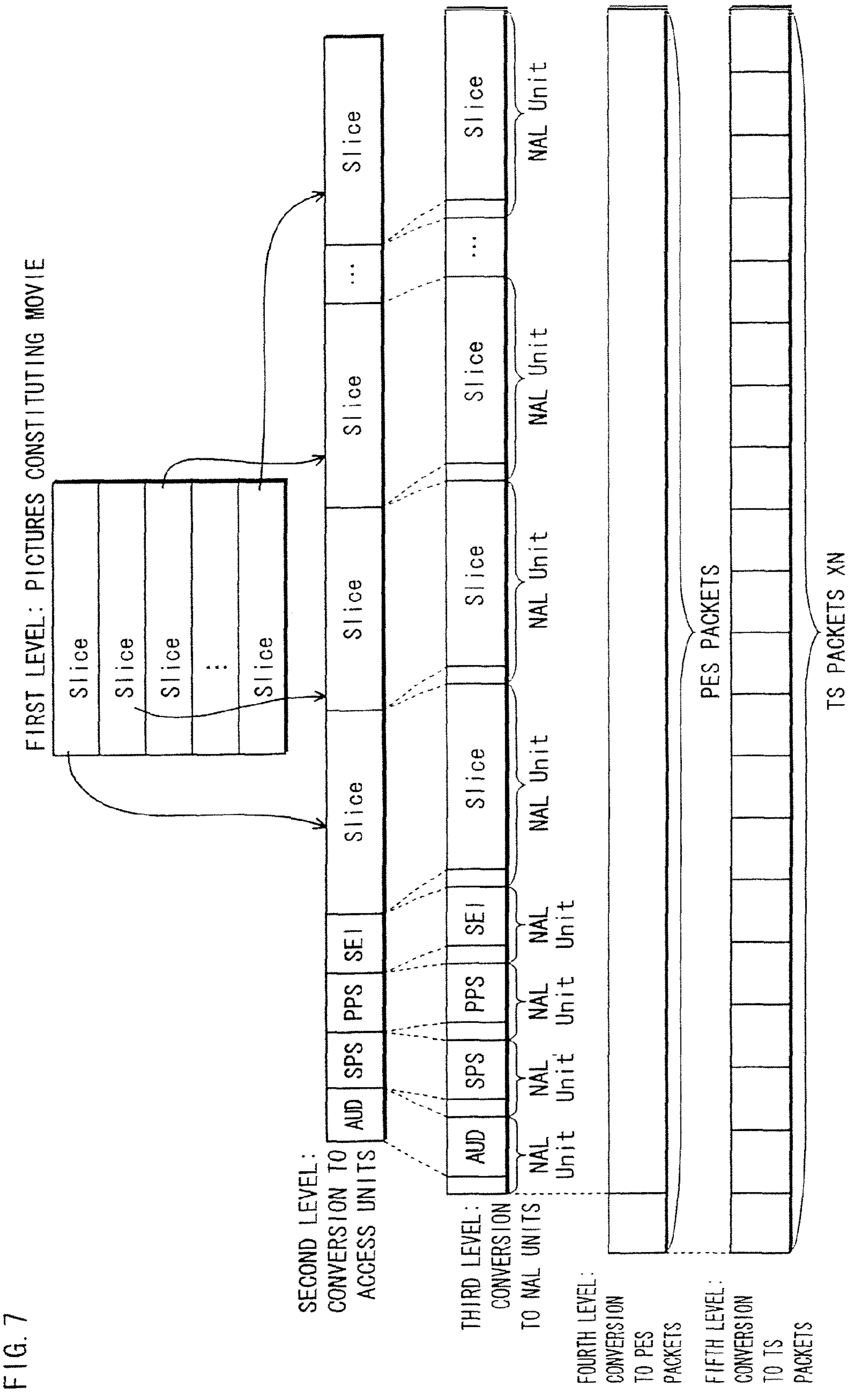
FIG. 7 illustrates the processes through which an IDR picture and a Non-IDR I picture are converted into TS packets.

Next, the following describes how IDR pictures and Non-IDR I pictures are converted into TS packets and recorded onto the BD-ROM. FIG. 7 illustrates the processes through which an IDR or Non-IDR I picture is converted into TS packets. In the figure, the first level illustrates an IDR or Non-IDR I picture. The second level illustrates an Access Unit stipulated according to MPEG4-AVC. A plurality of slices constituting the IDR or Non-IDR I picture is sequentially aligned. Then, AUD (Access Unit Delimiter), SPS (Sequence Parameter Set), PPS (Picture Parameter Set), SEI (Supplemental Enhanced Information) are attached to the slice sequence. In this way, the picture slices are converted into an Access Unit.

AUD, SPS, PPS, SEI, Access Unit mentioned above are information all stipulated according to MPEG4-AVC and described in various documents, such as "ITU-T Recommendation H.264". For the details, such documents should be referenced. The point in this description is that AUD, SPS, PPS, and SEI need to be supplied to a playback device for allowing random access to the video stream.

The third level represents NAL units. AUD, SPS, PPS, SEI, and each slice illustrated on the second level are each attached with a header so as to be converted into separate NAL units. NAL units are units supported by the Network Abstraction Layer (NAL) stipulated according to MPEG-4 AVC and described in various documents, such as "ITU-T Recommendation H.264". For the details, such documents should be referenced. The point in this description is that AUD, SPS, PPS, SED, and each slice are converted into separate NAL units and manipulated independently in the Network Abstraction Layer.

As described above, a plurality of NAL units obtained by converting the single picture are further converted into PES packets illustrated on the fourth level. The PES packets are then converted into TS packets. Finally, the resulting TS packets are recorded onto the BD-ROM.

In order to play back one GOP, the decoder needs to be supplied with a NAL unit containing AUD, among NAL units constituting the first IDR or Non-IDR I picture in the GOP. That is, the NAL unit containing AUD is used as an index for decoding the IDR picture or Non-IDR I picture. In this embodiment, each NAL unit containing AUD is regarded as a point. For playback of the video stream, the playback device recognizes each of such a point as an entry point for playback of a Non-IDR I picture and an IDR picture. Consequently, for implementation of random access to the AV Clip, it is extremely important for the playback device to recognize the locations of AUDs of IDR pictures and Non-IDR I pictures. This concludes the description of the structure of the MPEG-4AVC video stream used for presenting a movie.

<Slide Show>

Figure 5B:
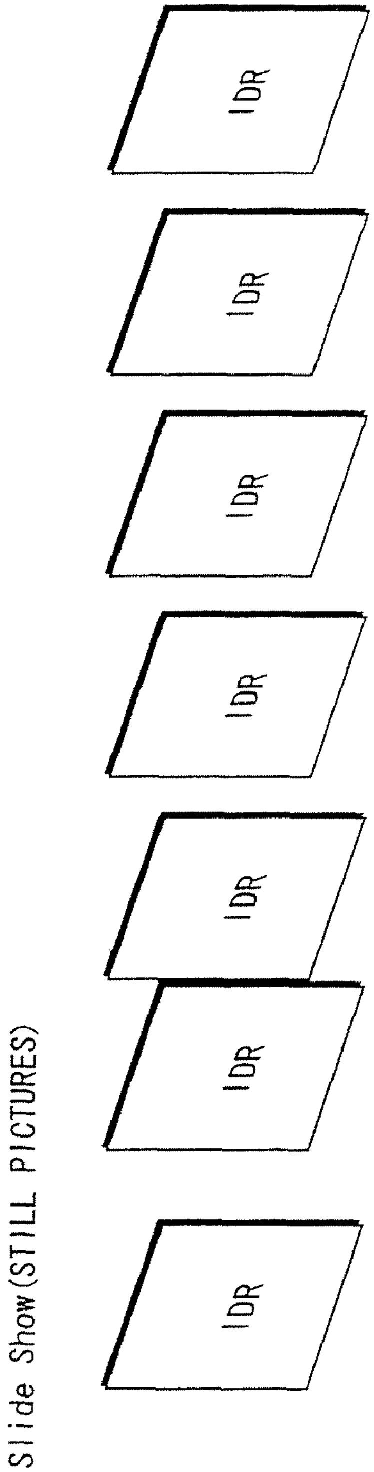
FIG. 5B illustrates the internal structure of a video stream used for presenting a slide show.

The following describes the video stream used for presenting a slide show. FIG. 5B illustrates the internal structure of the video stream used for presenting a slide show. As shown in this figure, the video stream used for presenting the slide show is composed of a plurality of pieces of still image data. Each of these pieces of data is an IDR picture. In other words, in the case of a slide show, the pictures are decoded as IDR pictures so that each picture is independently decoded.

A video stream and an audio stream are multiplexed to form the slide show according to the present invention. This slide show is a Timebased SlideShow in which the pictures included in the video stream are sequentially played back along with the progression of playback of the audio stream.

On the other hand, as a slide show to be recorded on a BD-ROM, there is another type called a browsable SlideShow, in which the audio stream is not multiplexed and the pictures are played back regardless of playback of audio stream.

Since both a movie and a Timebased SlideShow have a time line, the following describes only the case of a movie and a Timebased SlideShow.

The internal structure of the video stream constituting a slide show is described here.

Figure 8:
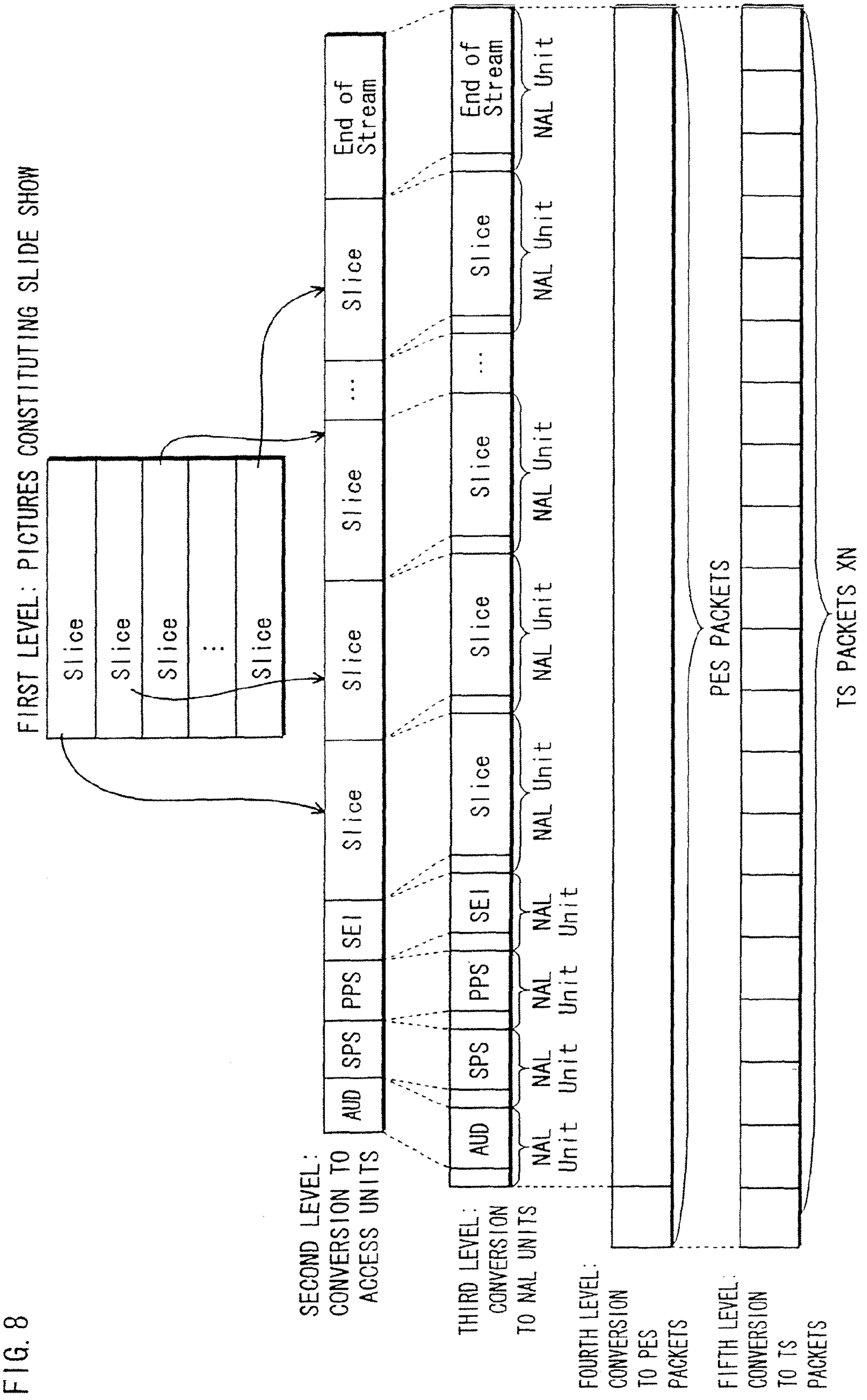
FIG. 8 illustrates how the IDR pictures for a slide show are recorded on the BD-ROM.

FIG. 8 illustrates how the IDR pictures for a slide show are recorded on the BD-ROM. The recording onto the BD-ROM is the same as FIG. 7 illustrates. That is to say, since each of the IDR pictures constituting the slide show is composed of a plurality of pieces of slice data, and each piece of slice data is converted to a NAL unit and recorded on the BD-ROM in the same manner as IDR pictures of a movie. The difference from FIG. 7 is that an "End of Stream code" is attached to the last piece of the slice data constituting the picture. The End of Stream code is a terminal code for instructing the playback device to freeze the operation of the decoder (Display Frozen). The End of Stream code is converted to one NAL unit, and then recorded on the BD-ROM.

Figure 9:
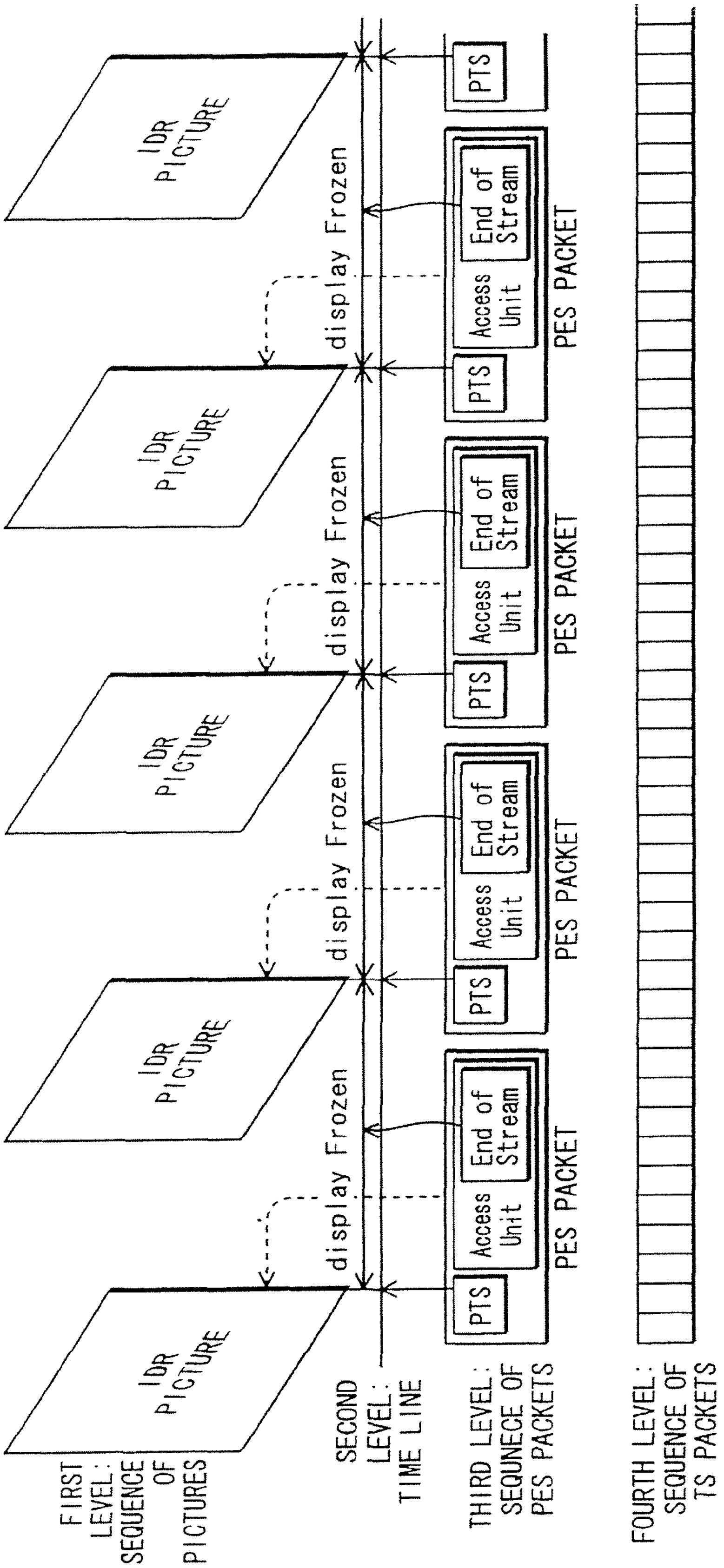
FIG. 9 illustrates progression of playback of a slide show.

The IDR pictures illustrated in FIG. 8 are sequentially provided to the decoder, and accordingly the playback of the slide show progresses as FIG. 9 illustrates. FIG. 9 illustrates progression of playback of the slide show. The fourth level of this figure shows a TS packet string, the third level shows a PES packet string obtained by converting the TS packets of the fourth level. The second level shows a time line of the slide show, and the first level shows the IDR pictures constituting the slide show. Each of the IDR pictures of the first level is displayed at a time indicated by the PTS in the PES packet of the third level. Since each PES packet of the third level includes the End of Stream code illustrated in FIG. 8, the playback device goes into a status where the operation of the decoder is frozen (Display Frozen) after displaying the IDR picture at a time indicated by the PTS in the PES packet. This Display Frozen status continues until when the next IDR picture is displayed. The playback device sequentially plays back the IDR pictures by repeating display of the picture performed at the time indicated by the PTS included in the PES packet and freezing of the operation of the decoder indicated by the End of Stream code. This concludes the description of the progression of playback of the slide show.

<Clip Information>

Figure 10:
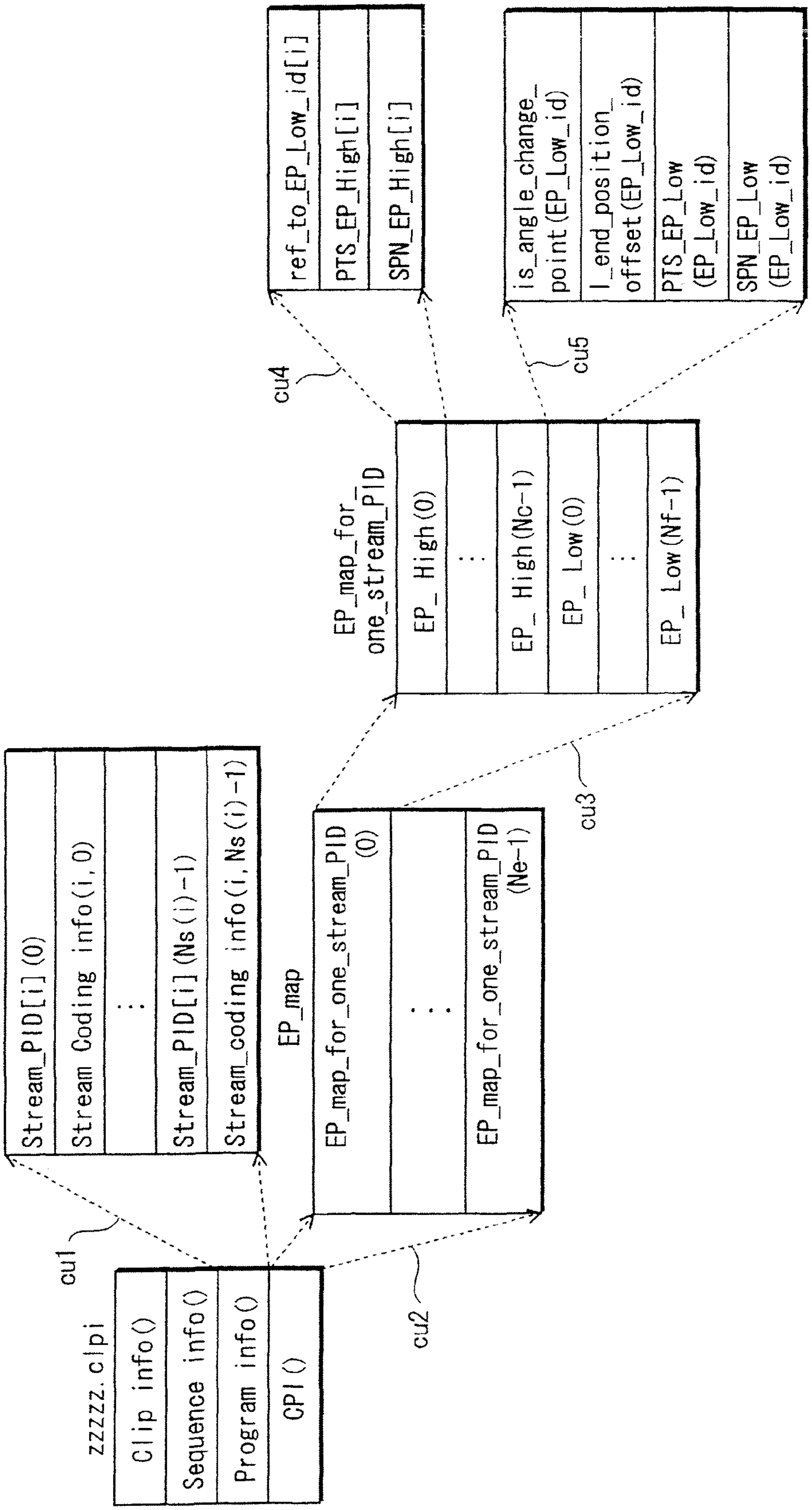
FIG. 10 illustrates the internal structure of Clip information.

Next, the following describes files with the extension ".clpi". Each file with the extension ".clpi" (e.g. 00001.clpi, 00002.clpi, 00003.clpi, . . . ) contains Clip information. Each piece of Clip information is management information of an individual AV Clip. FIG. 10 illustrates the internal structure of a piece of Clip information. As illustrated in the left block of the figure, the Clip information is composed of the following fields:

(i) "ClipInfo( )" storing the attributes of the AV clip file;

(ii) "Sequence Info( )" storing information related to the ATC sequence and STC Sequence;

(iii) "Program Info( )" storing information related to the program sequence; and (iv) "Characteristics Point Info (i.e., CPI( ))".

Leader lines cu1 in the figure indicates that the structure of the i-th program sequence (Program Sequence(i)) is illustrated in greater detail. As indicated by the leader lines cu1, the Program Info associated with the Program Sequence(i) is composed of the total number of Ns(i) pairs of Stream_PID and Stream_Coding_Info (in the figure, Stream_PID[i](0) and Stream_Coding_Info(i, 0)-Stream_PID[i](Ns(i)−1) and Stream_Coding_Info(i, Ns(i)−1)).

The Stream_PID is a packet identifier of an individual packet carrying an elementary stream constituting the AV clip. The Stream_Coding_Info indicates the coding standard used to encode the elementary stream.

Figure 11A:
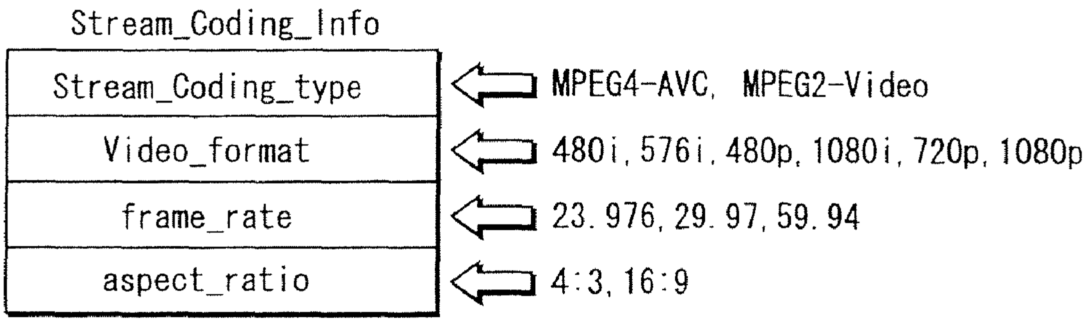
FIG. 11A illustrates Stream_Coding_Info of a video stream.
Figure 11B:
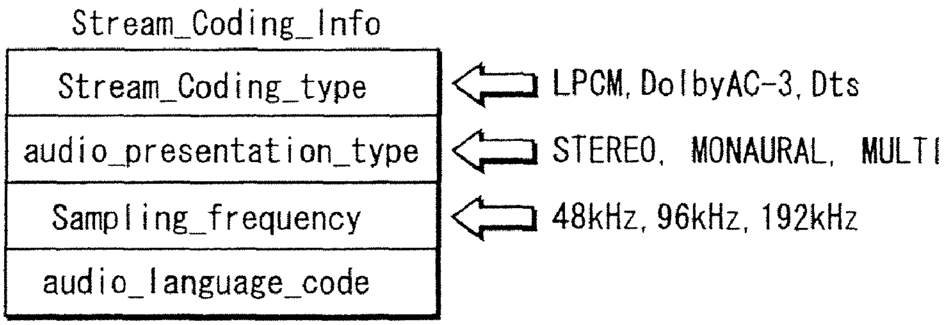
FIG. 11B illustrates Stream_Coding_Info of an audio stream.

FIG. 11A illustrates the Stream_Coding_Info associated with the video stream, whereas FIG. 11B illustrates Stream_Coding_Info associated with the audio stream. The Stream_Coding_Info is composed of the following fields: "stream_coding_type" indicating the coding method of the video stream is either MPEG4-AVC or MPEG2-Video; "video_format" indicating the video format is 480i, 576i, 480p, 1080i, 720p, or 1080p; "frame_rate" indicating the frame rate of the video stream is 23.976 Hz, 29.97 Hz, or 59.94 Hz; and "aspect_ratio" indicating the aspect ratio of the pictures is 4:3 or 16:9.

FIG. 11B illustrates the Stream_Coding_Info associated with the audio stream. As illustrated in the figure, the Stream_Coding_Info associated with the audio stream is composed of the following fields: "stream_coding_type"

indicating the coding type of the audio stream is LPCM, Dolby-AC3, or Dts; "audio_presentation_type" indicating the presentation type of the audio stream is stereo channel, mono channel, or multi-channel; "sampling_frequency" indicating the sampling frequency of the audio stream; and "audio_language" indicating a language code of the audio stream.

With reference to the Stream_Coding_Info, the playback apparatus is enabled to identify which of the elementary streams contained in an AV clip are MPEG4-AVC streams.

<CPI(EP_Map)>

Next, a description of CPI is given with reference to FIG. 10 again. Leader lines cu2 in the figure indicates that the structure of CPI is illustrated in greater detail. As illustrated in the leader lines cu2, the CPI is composed of a plurality of EP_map fields. Each EP_map is composed of Ne pieces of EP_map_for_one_stream_PID (namely, EP_map_for_one_stream_PID(0)-(Ne−1)). Each piece of EP_map_for_one_stream_PID is an EP_map associated with one of elementary streams contained in the AV clip. An EP_map is information indicating entry points set on the associated elementary stream. An entry point is where the Access Unit Delimiter of an I picture is present. The EP_map indicates the packet number of each entry point (SPN_EP_start) and the corresponding entry time (PTS_EP_start). Leader lines cu3 in the figure indicates that the internal structure of EP_map_for_one_stream_PID is illustrated in greater detail.

As illustrated in the figure, the EP_map_for_one_stream_PID is composed of Nc pieces of EP_High (EP_High (0)-(Nc−1)) and Nf pieces of EP_Low (EP_Low(0)-(Nf−1)). Here, the EP_High holds the most significant bits of the SPN_EP_start and PTS_EP_start of an I picture. The EP_Low holds the least significant bits of the SPN_EP_start and PTS_EP_start of the I picture.

Leader lines cu4 in the figure indicate that the internal structure of the EP_High is illustrated in greater detail. As illustrated in the leader lines cu4, EP_High(i) is composed of the following fields: "ref_to_EP_Low_id[i]" which is a reference value to the EP_Low; "PTS_EP_High[i]" indicating the most significant bits of the PTS for the I picture; and "SPN_EP_High[i]" indicating the most significant bits of the SPN for the I picture. Here, the reference numeral "i" denotes an identifier uniquely identifying an arbitrary EP_High field.

Leader lines cu5 in the figure indicate that the EP_Low structure is illustrated in greater detail. As indicated by the leader lines cu5, the EP_Low is composed of the following fields: "is_angle_change_point (EP_Low_id)"; "I_end_position_offset (EP_Low_id)" indicating the size of the associated I picture; "PTS_EP_Low(EP_Low_id)" indicating the least significant bits of the PTS of the associated I picture; and "SPN_EP_Low(EP_Low_id)" indicating the least significant bits of the SPN of the associated I picture. Here, the "EP_Low_id" denotes an identifier uniquely identifying an arbitrary EP_Low field.

The data structure of the EP_map as described above is basically disclosed, for example, in the above patent literature. Thus, no further description is given in this specification.

Figure 12:
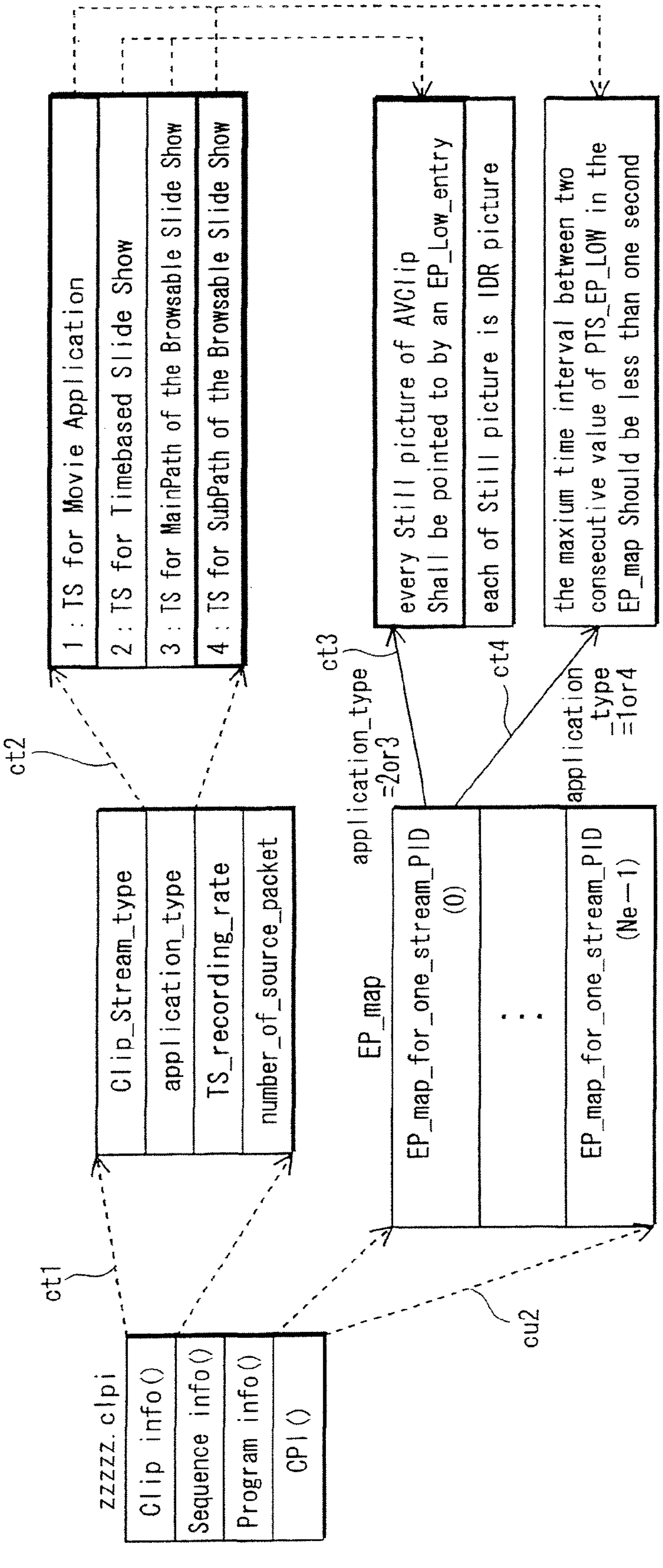
FIG. 12 shows an internal structure of Clip info in the Clip information.

Next, Clip info included in the Clip information is described. FIG. 12 illustrates the internal structure of the Clip info included in the Clip information. In the figure, leader lines ct1 indicates that the structure of ClipInfo( ) is illustrated in greater detail. As indicated by the leader lines ct1, the ClipInfo( ) is composed of the following fields: "clip_stream_type" indicating the type of the digital stream; "application_type" indicating the type of an application that uses the AV Clip; "TS_recording_rate" indicating the recoding rate of the AV Clip; and a "number_of_source_Packet" indicating the number of TS packets that constitutes the AV Clip. "application_stream_type" indicates whether the AVClip corresponding to this Clip information is a TS for Movie Application, a TS for Timebased SlideShow, a TS for MainPath of the Browsable SlideShow, or a TS for SubPath of the Browsable SlideShow. Specifically, if a) application_type=1, the AVClip is a Movie Application;

b) application_type=2, the AVClip is a Timebased SlideShow;

c) application_type=3, the AVClip is a MainPath of the Browsable SlideShow, where "MainPath" signifies that of the video stream—audio stream set that constitutes the Browsable SlideShow, the AVClip is the video stream; and d) application_type=4, the AVClip is a SubPath of the Browsable SlideShow, where "SubPath" signifies that of the video stream—audio stream set that constitutes the Browsable SlideShow, the AVClip is the audio stream.

Arrows ct3 and ct4 illustrated in FIG. 12 indicate secondary meanings of the application_type, that is, the data structure of the EP_map that changes in accordance with the value of the application_type.

The arrow ct4 in this figure indicates that when the application_type is 1 or 4, the interval between two consecutive values of the PTS_EP_start in the EP_map should be less than 1 second.

The arrow ct3 in this figure indicates the data structure of the EP_map when the value of the application_type is 2 or 3. More specifically, when the application_type is 2 or 3, the value of the PTS_EP_start should be set such that all the pictures included in the AV Clip are pointed. In other words, it is assured that all the pictures included in the AV Clip are pointed by the EP_map.

The following describes technical significance of attaching such secondary meanings to the application_type.

Setting all the pieces of picture data to be IDR pictures to create a slide show is merely one of various ideas. It is possible to use P pictures that have been coded with use of the relation to other pictures, or use B pictures that are coded that have been coded with use of the relation to two or more pictures ahead and behind the picture, to structure a video stream. Therefore, some authors might structure a slide show using P pictures and B pictures.

However, pictures to be referred to are necessary for decoding P pictures and B pictures. Therefore, for playing an arbitrary picture included in a slide show in accordance with a user's instruction, it is necessary to decode closest reference pictures to decode the picture.

Accordingly, every time a desired picture is played back, all the pictures referred to by the desired picture are required to be decoded. Therefore, a slide show structured by P pictures and B pictures might have low usability.

In a slide show, not like playback of a movie, the order of the playback of pictures is not sequential. In other words, it is necessary to play back a picture in accordance with a user's instruction. In this embodiment, to ensure that the play back can be started from any picture, the video stream used for presenting the slide show is composed of intra-coded IDR pictures each of which can be decoded independently. This means that the idea of constituting the slide show with P pictures and B pictures is expelled and all the pictures constituting the slide show are encoded to IDR pictures.

Based on this structure of the slide show, the entry points and the entry times of all the pictures are described in the EP_map. Accordingly, any picture data that the user wishes to decode can be played back by as a still picture only providing the picture data to the decoder.

Whether a video stream is used for presenting a slide show is indicated by application_type in Clip_info. Whether the application_type indicates a slide show has a secondary meaning, that is, whether the positions and the playback start times of the pictures constituting a video stream are indicated by the EP_map.

Since the application_type in Clip_info has such meanings, the playback device can know that each of the pictures constituting the video streams is IDR picture and does not refer to any other picture and that all the pictures are indicated by the EP_map, by referring to the Clip_info in the AV Clip to be played back.

As a result, to present the slide show, the playback device can decode a desired picture without decoding the previous and the next pictures.

This concludes the technical significance of the application_type and the EP_map.

Figure 13:
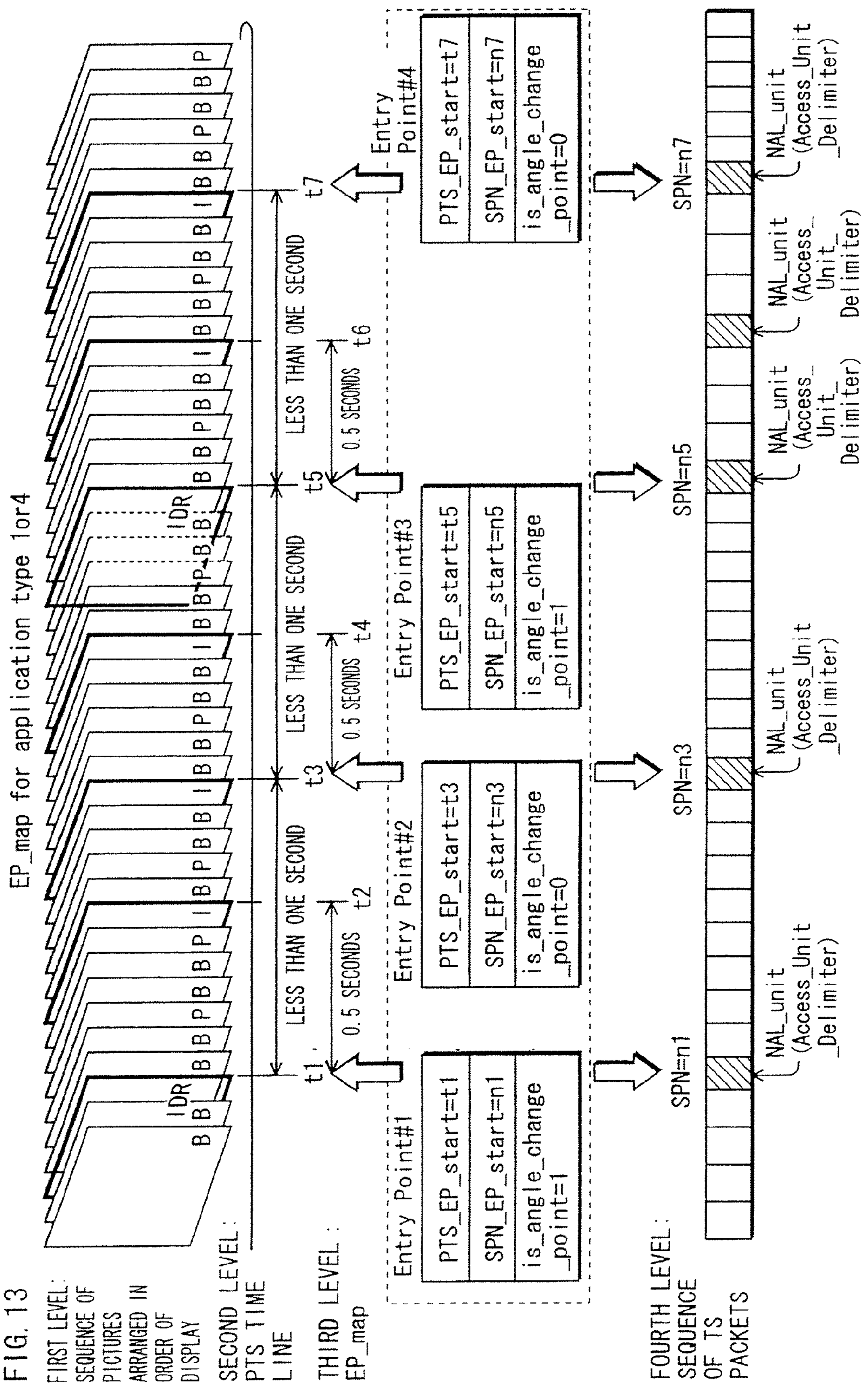
FIG. 13 illustrates the setting of an EP_map for a video stream carrying a movie.

The following describes the difference between configurations of EP_map for a movie and EP_map for a slide show, by taking a specific example. FIG. 13 illustrates a configuration of EP_map for a video stream (application_type=1 or 4) of a movie. The first level indicates a plurality of pictures aligned in the order of display. The second level indicates the time line of the pictures. The fourth level indicates TS packet string on a BD-ROM, and the third level indicates the configuration of the EP_map.

On the time line of the second level, Access Units (Non-IRD pictures and IDR pictures) are located at time points t1 to t7. If the intervals between t1 and t3, t3 and t5, and t5 and t7 are respectively approximately 1 second, the time points t1, t3 and t5 are set as entry time points (PTS_EP_start) in the EP_map of a video stream for presenting a movie so as to indicate the recording positions (SPN_EP_start) in correspondence with the time points. Among the Entry Points #1 to #4, the Entry Points #1 and #3 correspond to IDR pictures respectively. Therefore, a value "1" is set to is_angle_change_points for each of the Entry Points #1 and #3. Regarding the other Entry Points, namely Entry Points #2 and #4, a value "0" is set to is_angle_change_point for each.

FIG. 14 illustrates PTS_EP_start and SPN_EP_start for each of the Entry Point #1 to Entry Point #5, by a pair of EP_Low and EP_High. The EP_Low is illustrated in the left block of the figure, and the EP_High is illustrated in the right block of the EP_High.

Among EP_Low(0) to EP_Low(Nf−1), PTS_EP_Lows of EP_Low(i) to EP_Low(i+1) respectively indicate the lower bits of t1, t3, t5 and n7. Among EP_Low(0) to EP_Low(Nf−1), SPN_EP_Highs of EP_Low(i) to EP_Low(i+1) respectively indicate the lower bits of n1, n3, n5 and n7.

The right block in the figure illustrates EP_High (0) to EP_High (Nc−1) of the EP_map. Here, if t1, t3, t5 and t7 have a common higher bit, and n1, n3, n5 and n7 have a common higher bit, the common higher bits are described in the PTS_EP_High and SPN_EP_High respectively. ref_to_EP_Low_id corresponding to the EP_High is set to indicate the first EP_Low (EP_Low(i)). As a result, the common higher bit of the PTS_EP_start and the SPN_EP_start are represented by the EP_High.

Among is_angle_change_point(i) to (i+3) corresponding to EP_Low(i) to (i+3), the Access Units corresponding to is_angle_change_point(i) and is_angle_change_point(i+2) are Non-IDR pictures, and therefore a value "0" is set to the is_angle_change_point.

Figure 15:
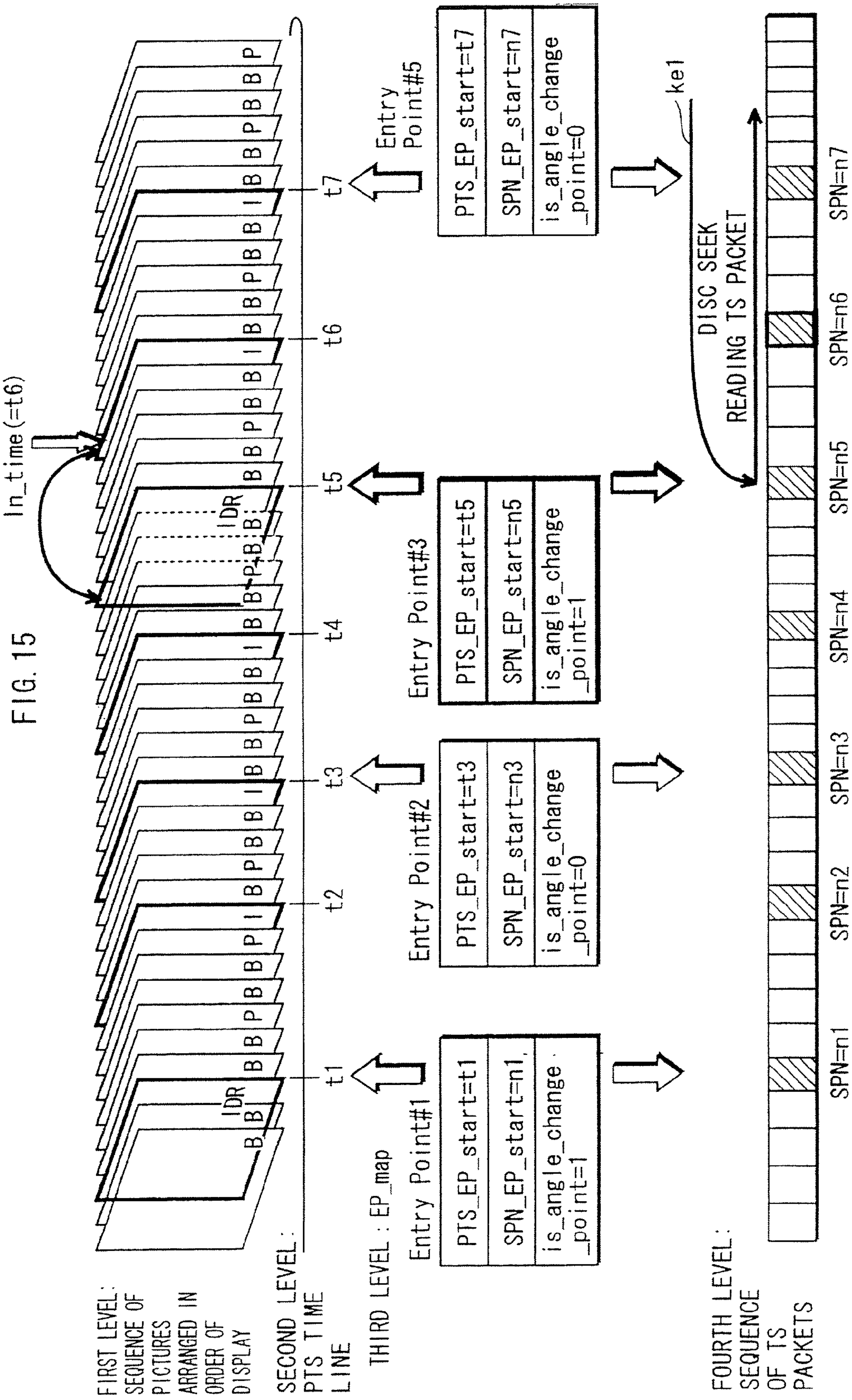
FIG. 15 illustrates the processes through which a random access to the video stream illustrated in FIG. 13.

Regarding a moving picture application for presenting a movie or the like, once decoding is started, the subsequent pictures are sequentially decoded. Therefore, it is unnecessary to designate all the Access Units in the EP_map, and only the points that are desired to be the starting points of the playback should be set in the EP_map as entries. In the case of a video stream used for representing a movie, since the interval between two consecutive values of the PTS_EP_start in the EP_Map is only required to be less than 1 second. Therefore, if the interval between an Access Unit and an adjoining Access Unit is only approximately 0.5 seconds (e.g. the case of pictures existing at t2 t4 and t6), the playback point of the Access Unit may not be indicated by the PTS_EP_start. FIG. 15 illustrates the processes through which a random access to the video stream illustrated in FIG. 13.

The following description is based on an assumption that the random access is performed from the In_time (=t6). In FIG. 15, t6 is not indicated by PTS_EP_start, and t5 is indicated by PTS_EP_start. The Entry_Point corresponding to t5 is set by is_angle_change=1, which indicates an IDR picture. Therefore, it is necessary to read the IDR picture at the playback point of t5. This is because it is possible to prepare all the reference pictures required for decoding the access target of the random access by reading the series of pictures from the IDR picture to the access target picture from the BD-ROM.

An arrow ke1 illustrated on the fourth level symbolically represents the above-described access performed via t5. This is the overhead of the random access.

Figure 16:
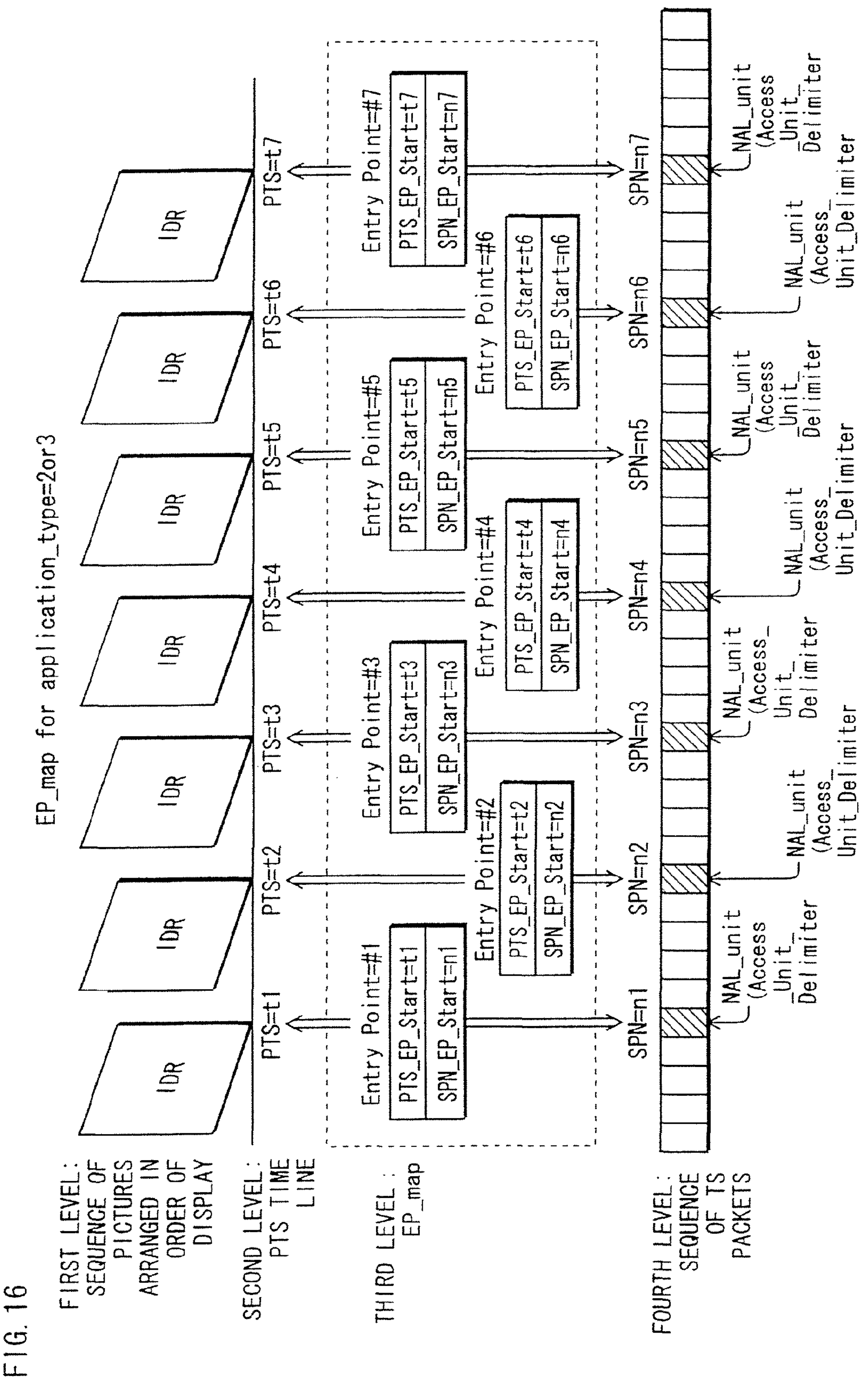
FIG. 16 illustrates the internal structure of EP_map set for a slide show.

Next, the configuration of EP_map in the case where the application_type indicates a slide show (application_type=2 or 3). It is assumed that the slide show includes IDR pictures for which PTSs are set such that the IDR pictures are played back at a plurality of time points (t1 to t7) on the time line. FIG. 16 illustrates the configuration of EP_map for such a slide show. FIG. 16 illustrates the internal structure of EP_map.

In the case of a slide show, the EP_map is configured to indicate all the pictures. Therefore, the Entry_Points #1 to #7 respectively specify the playback points t1, t2, t3, t4, t, t6 and t7 of the IDR pictures of the slide show as entry times (PTS_EP_start), and associates the playback points with the entry points (SPN_EP_start).

Figure 17:
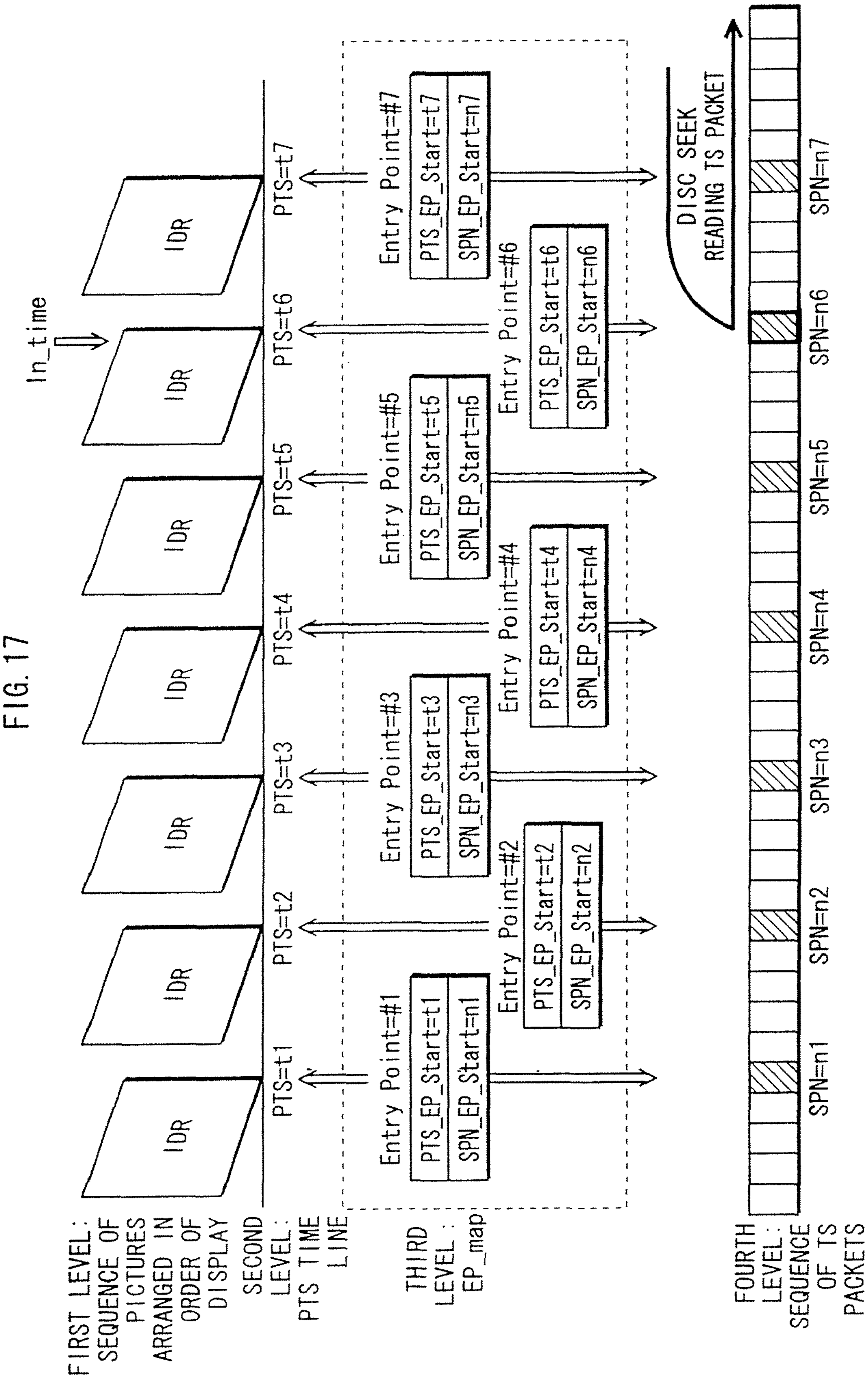
FIG. 17 illustrates a random access to a point of time on a time line, in the same manner as FIG. 16.

In this way, since all the playback points are specified by the EP_map as the entry times, no overheads occur regardless of which among t1 to t7 is selected as the access destination. FIG. 17 illustrates a random access to a point of time on a time line, in the same manner as FIG. 16. The meanings of the first to fourth levels are the same as those of FIG. 16. When performing the random access to t6, among t2, t4 and t6 on the second level, it is unnecessary to access a preceding IDR picture to access the recording position corresponding to t6 (SPN=n6), because the t6 itself is indicated by the PTS_EP_start.

Since all the pictures are encoded to be IDR pictures, and the playback points of all the pictures are indicated by the PTS_EP_start so as not to cause the overhead, it is possible to perform the random access in a slide show using the time information at a high speed.

In accordance with the above-described configuration of EP_map, if a value "2" or "3" is set the application_type, it is possible to identify that the entry points for all the pictures constituting the slide show exist in the EP_map. Therefore, the range of pieces of data to be read can be found by referring to the entries in the EP_map, and it is unnecessary to analyze the previous and the next streams.

The above is the description of the Clip information according to this embodiment. Note that files with the "mpls" extension are not explained in this embodiment, but explained in the second embodiment.

This concludes the description of the recording medium according to the present invention. The following describes the playback device according to the present invention.

<Internal Structure of Playback Device>

Figure 18:
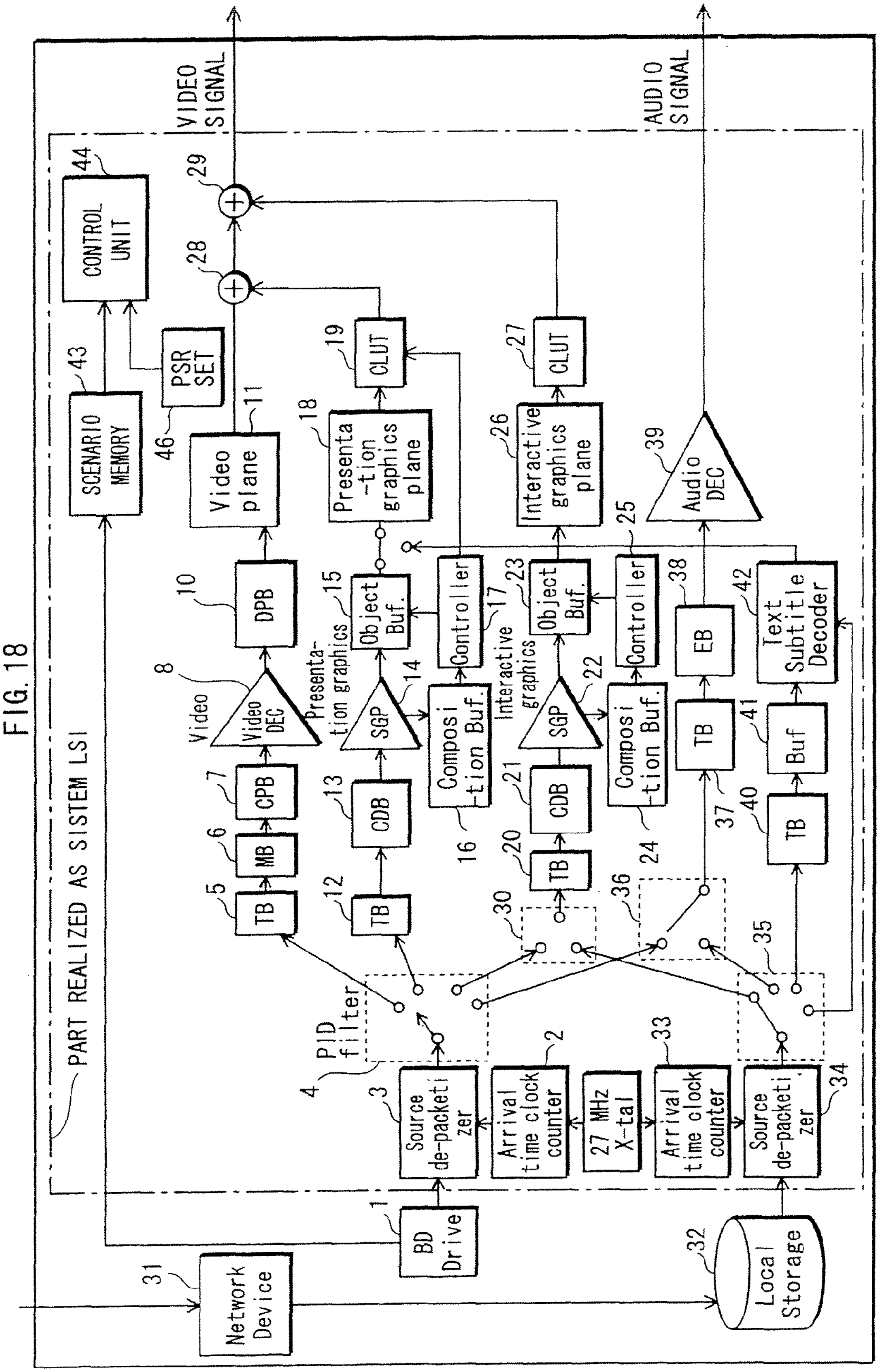
FIG. 18 illustrates the internal structure of a playback device according to the present invention.

FIG. 18 illustrates the internal structure of the playback device. Based on the internal structure illustrated in the figure, playback devices consistent with the present invention are industrially manufactured. The playback device of the present invention is roughly composed of two parts, one of which is a system LSI and the other is a drive device. By mounting those parts into a device cabinet and onto a substrate, the playback device can be manufactured industrially. The system LSI is an integrated circuit containing various processing units for implementing the functions of the playback device. The playback device manufactured in the above manner is composed of a BD drive 1, an arrival time clock counter 2, a source de-packetizer 3, a PID filter 4, a transport buffer 5, a multiplexed buffer 6, a coded picture buffer 7, a video decoder 8, a decoded picture buffer 10, a video plane 11, a transport buffer 12, a coded data buffer 13, a stream graphics processor 14, an object buffer 15, a composition buffer 16, a composition controller 17, a presentation graphics plane 18, a CLUT unit 19, a transport buffer 20, a coded data buffer 21, a stream graphics processor 22, an object buffer 23, a composition buffer 24, a composition controller 25, an interactive graphics plane 26, a CLUT unit 27, a compositor 28, a compositor 29, a switch 30, a network device 31, a local storage 32, an arrival time clock counter 33, a source de-packetizer 34, a PID filter 35, a switch 36, a transport buffer 37, an elementary buffer 38, an audio decoder 39, a transport buffer 40, a buffer 41, a text subtitle decoder 42, a scenario memory 43, a controller 44 and a PSR set 46. Note that the internal structure illustrated in the figure is a decoder model based on the MPEG T-STD model and capable of downconverting. In this figure, the part surrounded by the dashed line is realized as a one-chip system LSI.

The BD drive 1 loads/ejects the BD-ROM and accesses the BD-ROM to sequentially reads Aligned Units each composed of 32 sectors.

The arrival time clock counter 2 generates an arrival time clock using a 27 MHz crystal oscillator (27 MHz X-tal). The arrival time clock is a clock signal defining the time line on which the ATS assigned to each TS packet is based.

Once an Aligned Unit composed of 32 sectors is read from the BD-ROM, the source de-packetizer 3 removes the TP_extra_header from each of the 32 ES-TS packets and outputs the TS packets without the headers to the PID filter 4. The output by the source de-packetizer 3 to the PID filter 4 is performed at the timing when the time measured by the arrival time clock counter 2 reaches the ATS shown by the TP_extra_header. Since the output to the PID filter 4 is carried out in accordance with the ATS, the TS packets are sequentially output to the PID filter 4 in accordance with the time measured by the arrival time clock counter 2, regardless of the speed at which data is read from the BD-ROM, such as 1×-speed or 2×-speed.

The PID filter 4 judges, with reference to the PID attached to the TS packets, the type of stream to which the TS packets belong is a video stream, a PG stream, or an IG stream. According to the judgment, the PID filter 4 outputs the TS packets to one of the transport buffer 5, the transport buffer 12, the transport buffer 20, and transport buffer 37.

The transport buffer (TB) 5 is a buffer for temporarily storing TS packets output from the PID filter 4, if the TS packets belong to a video stream.

The multiplexed buffer (MB) 6 is a buffer for temporarily storing PES packets output from the transport buffer 5, in order to later output the video stream to the coded picture buffer 7.

The coded picture buffer (CPB) 7 is a buffer for storing coded pictures (Non-IDR I pictures, IDR pictures, B pictures, and P pictures).

The video decoder 8 decodes individual frames contained in the video elementary stream at every predetermined decoding time (DTS) to obtain a plurality of frames and renders the resulting picture data on the decoded picture buffer 10.

The decoded picture buffer 10 is a buffer on which decoded picture data is rendered.

The video plane 11 is used for presenting uncompressed picture data. A plane is a memory area of the playback device for storing a frame of pixel value data. The video plane 11 stores picture data at the resolution of 1920×1080, and the picture data is composed of pixel values each expressed by 16-bit YUV values.

The transport buffer (TB) 12 is a buffer for temporarily storing TS output from the PID filter 4, if the TS packets belong to a PG stream.

The coded data buffer (CDB) 13 temporarily stores PES packets constituting a PG stream.

The stream graphics processor (SGP) 14 decodes PES packets (ODS) that store graphics data to obtain uncompressed bitmap expressed by index colors, and renders the obtained bitmap as a graphics object on the object buffer 15.

The object buffer 15 holds the graphics object obtained by decoding an ODS by the stream graphics processor 14.

The composition buffer 16 is a memory for storing control information (PCS) for rendering the graphics data.

The graphics controller 17 analyses the PCS stored in the composition buffer 16, and perform control based on the analysis result.

The presentation graphic plane 18 is a memory area as large as one full screen and stores uncompressed graphics data worth one screen. The presentation graphic plane 18 stores uncompressed graphics data at the resolution of 1920×1080 and the uncompressed graphics data is composed of pixel values each expressed using an 8-bit index colors. By converting the index colors with reference to a CLUT (Color Lookup Table), the uncompressed graphics data stored on the presentation graphics plane 18 is supplied for display.

The CLUT unit 19 converts the index colors of the uncompressed graphics data stored on the presentation graphic plane 18 to Y, Cr, and Cb values.

The transport buffer (TB) 20 is a buffer for temporarily storing TS packets belonging to an IG stream.

The coded data buffer (CDB) 21 is a buffer for temporarily storing PES packets constituting an IG stream.

The stream graphics processor (SGP) 22 decodes PES packets (ODS) that store graphics data to obtain uncompressed bitmap expressed by index colors, and renders the obtained bitmap as a graphics object on the object buffer 23.

The object buffer 23 holds the graphics object obtained by decoding an ODS by the stream graphics processor 22.

The composition buffer 24 is a memory for storing control information (PCS) for rendering the graphics data.

The graphics controller 25 analyses the PCS stored in the composition buffer 24, and perform control based on the analysis result.

The interactive graphics plane 26 is used for presenting uncompressed graphics data obtained by decoding graphics object by the stream graphics processor (SGP) 22. The graphics data is rendered on the interactive graphics plane 26 at the resolution of 1920×1080, and the graphics data is composed of pixel values each expressed using 8-bit index colors. By converting the index colors with reference to the CLUT (Color Lookup Table), the uncompressed graphics data stored on the interactive graphics plane 26 is supplied for presentation.

The CLUT unit 27 converts the index colors of the uncompressed graphics data stored on the interactive graphics plane 26 to Y, Cr, and Cb values.

The compositor 28 overlays the uncompressed frame data rendered on the video plane 11 with the uncompressed graphics object rendered on the presentation graphic plane 18. As a result of the overlaying, the composite image in which text subtitles are overlaid on video is obtained.

The compositor 29 overlays the uncompressed graphics object rendered on the interactive graphics plane 26 with the composite image (uncompressed picture data overlaid with the uncompressed graphics object rendered on the presentation graphic plane 18) output from the compositor 28.

The switch 30 selectively supplies the TS packets read from the BD-ROM or the TS packets read from the local storage to the transport buffer 20.

The network device 31 is used to implement communications functionality of the playback device. More specifically, the network device 31 establishes TCP connection, FTF connection, and so on with a web site at an URL. The local storage 32 is a hard disk for storing contents provided via various types of recording media or communication media. The contents downloaded from the web site via the connection established by the network device 31 are stored to the local storage 32.

The source de-packetizer 34 removes the TP_extra_header from each TS packet constituting the AV clip read from the local storage 32 and outputs the TS packets without headers to the PID filter 35. The output of the TS packets to the PID filter 35 is carried out at the timing when the time measured by the arrival time clock counter 33 reaches the ATS shown by the TP_extra_header.

The PID filter 35 switches to output the TS packets read from the local storage 32 toward either of the IG stream decoder, the audio decoder, and the text subtitle decoder.

The switch 36 supplies toward the audio decoder 39 the TS packets read from the BD-ROM or from the local storage 32. The TS packets constitute the primary audio stream. By the presence of the switch 36, the primary audio stream can be supplied to the audio decoder 39 from either of the BD-ROM and the local storage 32.

The transport buffer (TB) 37 stores TS packets carrying the audio stream.

The elementary buffer (EB) 38 stores the PES packets carrying the audio stream.

The audio decoder 39 decodes the PES packets output from the elementary buffer 38 and outputs uncompressed audio data.

The transport buffer (TB) 40 stores TS packets carrying the text subtitle stream.

The elementary buffer (EB) 41 stores PES packets carrying the secondary audio stream.

The text subtitle decoder 42 decodes the PES packets read into the buffer 41 for display. This decoding is performed by expanding text strings included in the text subtitle stream into a bitmap, using fonts independently read from the local storage 32. The text subtitles obtained by the decoding is to be written in the presentation graphics plane 18.

The scenario memory 43 stores current Clip information. The current Clip information used herein refers to the currently processed Clip information from among a plurality of pieces of Clip information stored on the BD-ROM.

The controller 44 is composed of an instruction ROM and CPU and executes software stored on the instruction ROM to carry out overall control of the playback device. The control executed on the playback device dynamically changes in response to a user event generated upon receipt of a user operation and in accordance with the values held in each PSR of the PSR set 46.

The PSR set 46 is a set of non-volatile registers provided within the playback device. The set of registers include 64 player status registers (PSR(1)-PSR(64)) and 4,096 general-purpose registers (GPRs). The 64 player status registers (PSRs) represent the current status of the playback device, including the current playback point.

Among the 64 player status registers (PSR(1)-PSR(64)), PSR(8) is set to a value from 0-0xFFFFFFFF and indicates the current playback point (current PTM) in 45 kHz accuracy.

This concludes the description of the internal structure of the playback device.

The following describes a processing procedure performed by the control unit 44.

For playing back a video stream in the MPEG4-AVC format, the control unit 44 controls the BD drive 1 and the video decoder 8 to perform the random access.

One example of random access is time-search playback. The time-search playback is executed upon receipt of timing information from a user and playback of a video stream is started from a playback point corresponding to a specific time and second indicated in the timing information. At the time of executing the jump playback, the controller 44 converts the timing information into an Access Unit address (also called "the I picture address") stored on the BD-ROM. Then, the controller 44 causes the BD-ROM to be read starting from the TS packet at the thus obtained Access Unit address and causes the read TS packets to be sequentially supplied to the decoder.

Figure 19:
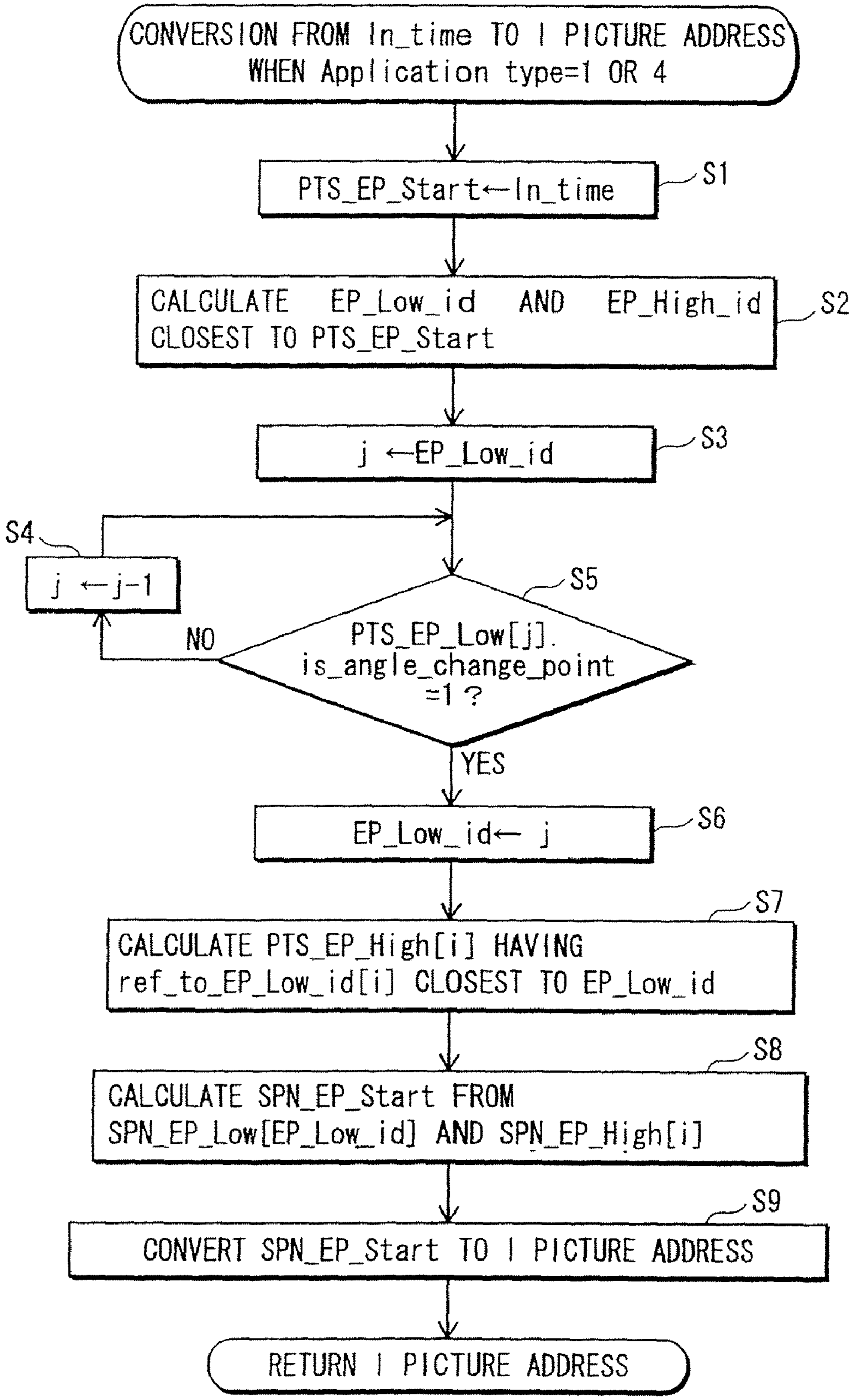
FIG. 19 is a flowchart showing a processing procedure for converting time information to an I picture address with respect to a video stream used for presenting a movie.

The principal part of the above-mentioned playback control is a process of deriving an Access Unit address from timing information. FIG. 19 is a flowchart of a process of converting timing information into an Access Unit address, regarding a video stream used for presenting a movie. In the flowchart, the timing information denoted as In_time specifies an access target of the random access. In Step S1 illustrated in FIG. 19, the value of In_time is assigned to PTS_EP_start. Step S2 is to calculate a pair of EP_High_id and EP_Low_id values indicating an entry point that is near the PTS_EP_start. More specifically, the EP_High_id to be calculated is an identifier specifying a nearby EP_High preceding the In_time. On the other hand, the EP_Low_id is an identifier specifying an EP_Low indicating a nearby temporal point following the EP_High [EP_High_id] and preceding the In_time.

In order to calculate the value of EP_High_id, the controller 44 keeps adding the time length of each PTS_EP_High included in a plurality of EP_High values until the total Σ of the time lengths first exceeds the In_time. The time length indicated by each PTS_EP_High is a time unit whose most significant bits are held by the PTS_EP_High. The controller 44 then identifies the k-th EP_High_id that results in the total Σ first exceeding the In_time and determines the value obtained by (k−1) as the value of EP_High_id.

Similarly, to calculate the value of EP_Low_id, the controller 44 keeps adding, to the total Σ of up to the PTS_EP_High (EP_High_id), the time length indicated by each PTS_EP_Low included in EP_Low, until the resulting total first exceeds In_time. The controller 44 then identifies the h-th EP_Low_id that causes the resulting total to first exceeds the In_time, and determines the value obtained by (h−1) as the value of EP_Low_id.

The pair of EP_High_id and EP_Low_id values specifies a nearest entry point preceding the In_time.

Once the EP_Low_id value is obtained, the controller 44 enters a loop composed of Steps S3-S5. More specifically, the controller 44 assigns the EP_Low_id value to a variable j (Step S3) and executes the loop composed of the Steps S4 and S5. In each iteration of the loop, the variable j is decremented by "1" (Step S4) and a judgment is made as to whether the is_angle_change_point (PTS_EP_Low[j].is_angle_change_point) is set to the value "1" (Step S5). The loop is repeatedly executed unit the judgment in the Step S5 results in YES, i.e. as long as the is_angle_change_point field of each entry point is set to "0".

That is, the loop is terminated if the entry point specified by the variable j has the is_angle_change_point set to the value "1". When the judgment in the Step S5 results in YES, the controller 44 assigns the value of variable j to the EP_Low_id (Step S6) and calculates the EP_High[i] having the ref_to_EP_Low_id[i] that specifies an entry point near the EP_Low_id (Step S7). Once the values of the EP_Low_id and the variable i are calculated, the controller 44 calculates the SPN_EP_Start using the SPN_EP_Low[EP_Low_id]and SPN_EP_High[i] values (Step S8). Finally, the thus calculated SPN_EP_start value is converted into an Access Unit address (Step S9).

An SPN is a serial number assigned to an individual TS packet. In order to read a TS packet having a specific SPN, the SPN needs to be converted into a relative sector number. As illustrated in FIG. 4, TS packets are converted into Aligned Units each containing 32 TS packets, and each Aligned Unit is recorded in three sectors. Thus, by dividing the SPN by 32, the number of the Aligned Unit containing the Access Unit is calculated. Then, by multiplying the Aligned Unit number by 3, the sector address of the Aligned Unit located near the SPN is calculated. The sector address calculated in the above manner is a relative sector number counted from the start of one AV clip. Thus, by setting the file pointer to the relative sector number, the playback apparatus reads the AV clip to supply the Access Unit to the video decoder 8.

Figure 20:
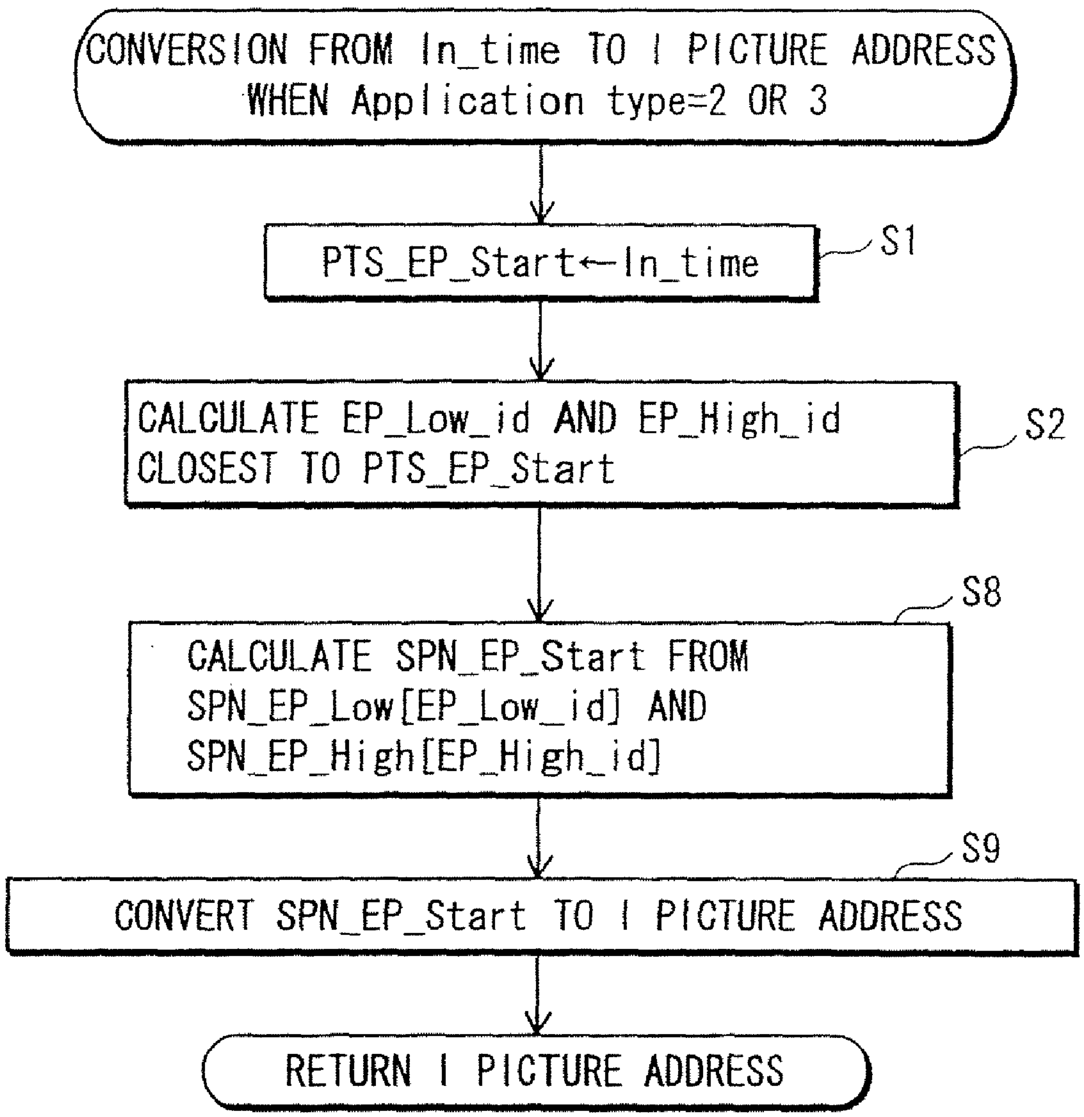
FIG. 20 is a flowchart showing a processing procedure for converting time information to an Access Unit address with respect to a video stream used for presenting a slide show.

FIG. 20 shows is a flowchart showing a processing procedure for converting time information to an Access Unit address with respect to a video stream used for presenting a slide show In a slide show, all the pictures included in the video stream are IDR pictures, and the playback point of each is designated by PTS_EP_start. Therefore, it is possible to convert the In_time to the address of the IDR picture without performing Steps S3 to S7.

More specifically, in Step S1, the In_time is set to the PTS_EP_start, and in Step S2, a pair of EP_High_id and EP_Low_id that is closest to the PTS_EP_start is obtained. Then, the SPN_EP_start is obtained from the SPN_EP_Low [EP_Low_id] and SPN_EP_High[EP_High_id] (Step S8) to obtain the Access Unit address (Step S9). This means that the procedure for obtaining the Access Unit address is greatly simplified.

Here, also in the case of playing back a slideshow, the procedure of Step S1 in FIG. 19 is performed. In other words, to obtain the EP_High_id, the control unit 44 adds the durations indicated by each PTS_EP_High of a plurality of EP_Highs, and judges how many EP_High_ids are added when the total Σ of the durations becomes larger than the In_time. Here, if the total Σ becomes larger than the In_time when the 1st to kth EP_High_ids are added, a value "k−1" is considered as EP_High_id.

To obtain the EP_Low_id, the control unit 44 adds the durations indicated by each PTS_EP_Low of a plurality of EP_Lows to the total Σ as the total up to the PTS_EP_High (EP_High_id), and judges how many EP_Low_ids are added when the total Σ of the durations becomes larger than the In_time. Here, if the total Σ becomes larger than the In_time when the 1st to hth EP_Low_ids are added, a value "h−1" is considered as EP_Low_id.

Based on the pair of the EP_High_id and the EP_Low_id obtained in the above-described manner, the Entry Point that is the same as the In_time or the closest to the In_time.

In this way, if there is any PTS_EP_start that is the same as the In_time, it is possible to perform reading and playback of the picture data from, among the plurality of PTS_EP_starts in the EP_map, the SPN_EP_start corresponding to the PTS_EP_start that is the same as the In_time.

Among the plurality of PTS_EP_starts in the EP_map, if there is no PTS_EP_start that is the same as the In_time, reading and playback of picture data from the SPN_EP_start corresponding to the PTS_EP_start closest to the In_time is performed.

As described above, according to this embodiment, in a slide show that does not display the previous and the next picture in accordance with the user's instruction, and in accordance with skip operation and so on, displays still pictures regardless of the order of the pictures, all the still pictures are IDR pictures indicated by the EP_map, and it is unnecessary to analyzes the streams.

Also, each Access Unit (Non-IDR I picture, IDR picture) is designated by Enrty_Point in EP_map. Therefore, it is possible to directly access only necessary Access Units to read the Access Units and supply the Access Units to the decoder. This means that the access efficiency is high and the time required for displaying the data is short.

Note that a flag for ensuring that the entry addresses of all the pieces of the picture data constituting the video stream may be recorded in a EP_map or navigation information relating thereto.

Second Embodiment

The second embodiment relates to improvement of setting of chapters on a time line of a slide show.

The following describes information for defining the chapters.

The information for defining the chapters is PlayList information, which exists in files with the "mpls" extension. The following describes the PlayList Information.

<PlayList Information>

Figure 21:
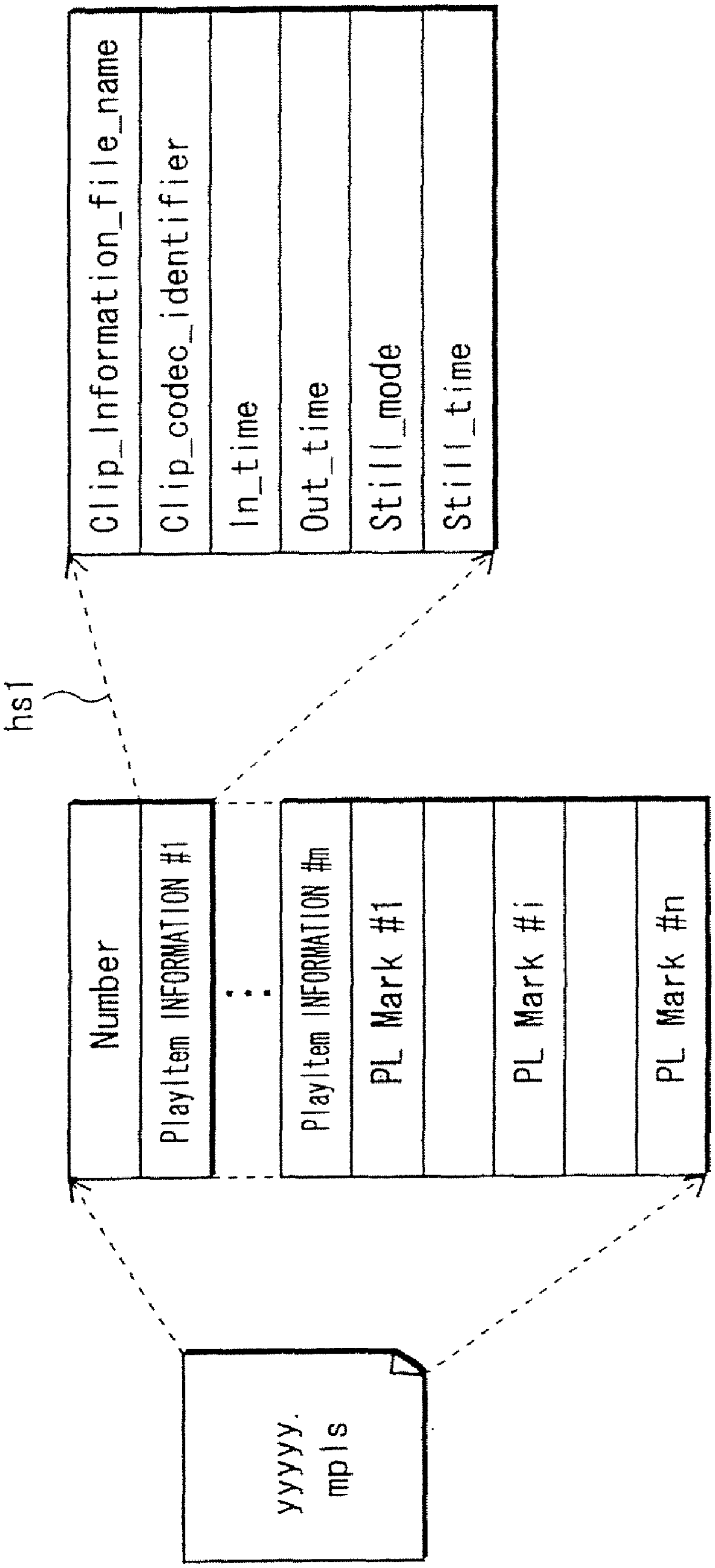
FIG. 21 illustrates the structure of PlayList information.
Figure 22:
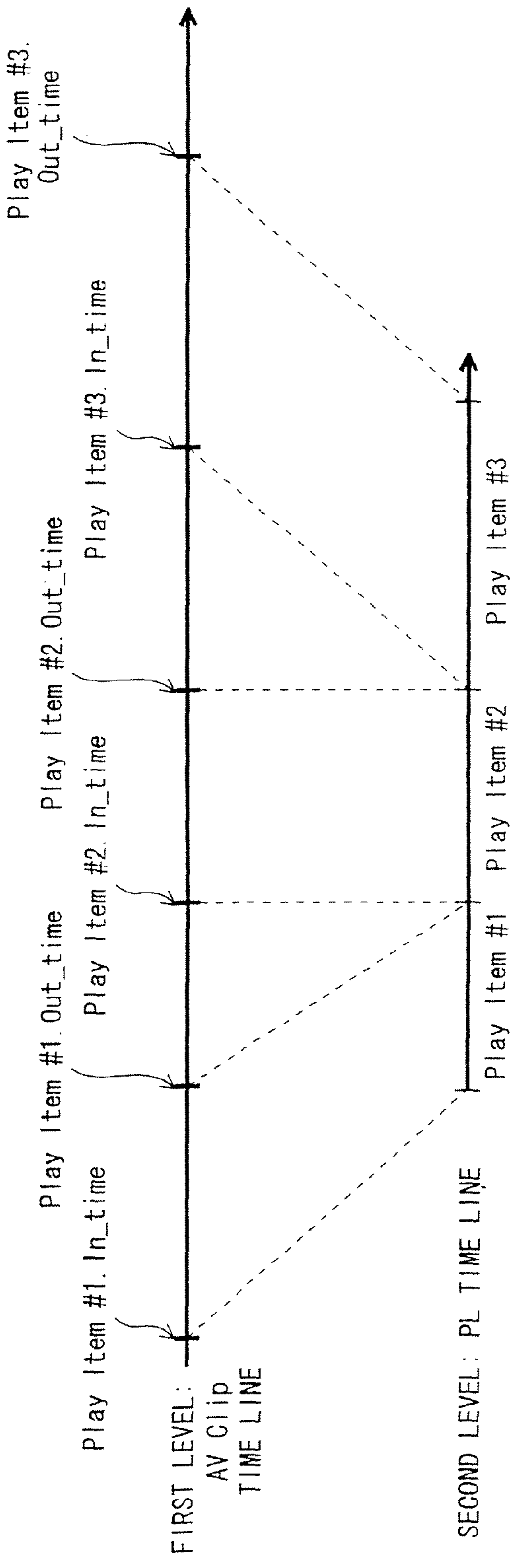
FIG. 22 illustrates a relation between AV Clip and PlayList information.

Next is a description of PlayList information. Files with the "mpls" extension (00001.mpls, 00002.mpls, 00003.mpls, . . . ) are files storing PlayList information. PlayList information defines a playback path called a PlayList with reference to an AVClip. FIG. 21 shows a structure of the PlayList information, which as shown in the left side of the figure includes a plurality of pieces of PlayItem Information. A PlayItem is a playback period that is defined by specifying an In_time and an Out_time on at least one AVClip time-axis. Arranging a plurality of pieces of PlayItem information defines a PlayList (PL) that is composed of a plurality of playback periods. A dashed line hs1 in the figure indicates a detailed structure of the PlayItem information. As shown in the figure, the PlayItem information is composed of "Clip_information_file_name" which indicates a corresponding piece of Clip information, "Clip_codec_identifier" which indicates an encoding method of a corresponding AVClip, "In_time" which indicates a time at which playback of the AVClip is to be started, "Out_time" which indicates a time at which playback of the AVClip is to be ended, "Still_m- ode", and "Still_time". FIG. 22 shows a relation between the AV Clip and the PlayList information. The first level illustrates the time line of the AV Clip. The second level illustrates the time line of the PlayList information (Hereinafter called "the PL time line"). The PlayList information includes three pieces of PlayList information, namely PlayItem Info #1, PlayItem Info #2 and PlayItem Info #3. The pairs of In_time and Out_time in the respective pieces of PlayItem Info #1, #2 and #3 define three playback sections. When aligning the three playback sections, a time line that is different from the AV clip time line is defined. This time line is the PL time line illustrated on the second level. As described herein, by defining PlayItem information, a different time line from the AV clip time line is defined.

It is Still_mode and Still_time that are characteristic among the information elements that constitute this PlayList information.

"Still_mode" indicates whether to still-display a last piece of picture data when playing back picture data from the In_time to the Out_time. If configured to "00", the Still_mode indicates that still-display is not to be continued. If configured to "01", the Still_mode indicates that still-display is to be continued for a limited time period. If the Still_mode is configured to "01", the length of still-display is configured to Still_time. If configured to "02", the Still_mode indicates continuation of still-display for an unlimited time period. An explicit operation from a user cancels the display in the case of still-display for an unlimited time period.

If the Still_mode is configured to 01, the length of time still-display is to be continued is indicated by "Still_time" in units of seconds.

This completes the description of PlayItem information pertaining to the present embodiment. Next is a description of PL Mark information.

Figure 23:
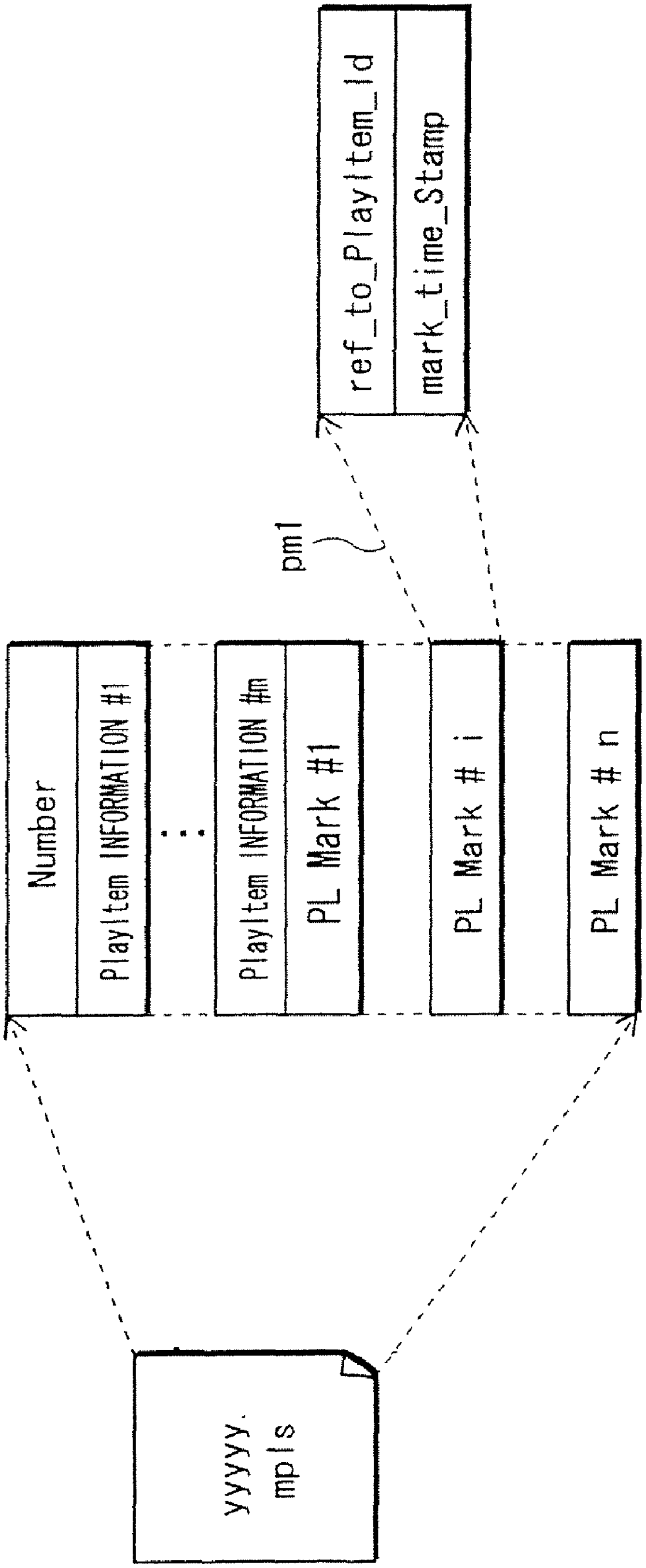
FIG. 23 illustrates the internal structure of each of a plurality of pieces of PLMark information included n the PlayList information according to the second embodiment.
Figure 24:
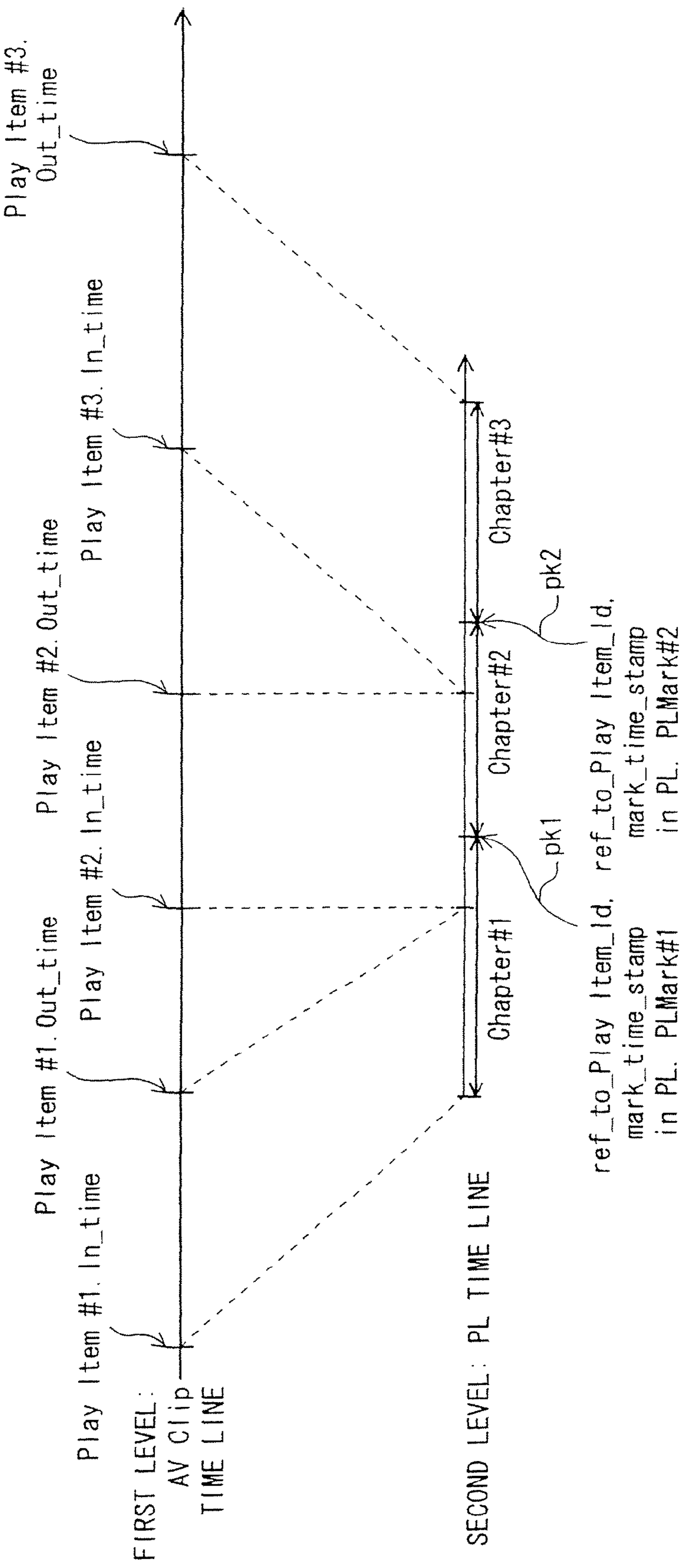
FIG. 24 illustrates chapter definitions defined by PLMark information.

FIG. 23 shows an internal structure of each of a plurality of pieces of PLMark information, which is included in PlayList information according to the second embodiment. PLMark information (PLMark( )) shown in FIG. 23 is information that specifies an arbitrary period on a PL time-axis as chapter points. As shown by a lead line pm1 in FIG. 23, the PLMark information includes "ref_to_PlayItem_Id", and "mark_time_stamp". FIG. 24 illustrates definitions of chapters according to the PLMark information. In this figure, the first level illustrates the time line of the AV Clip, and the second level illustrates the PL time line. Arrows pk1 and pk2 respectively indicate designations of PlayItem (ref_to_PlayItem_Id) and a point of time (mark_time_stamp). These designations define the three chapters (Chapters #1, #2 and #3) on the PL time line. This concludes the description of PLMark.

Figure 25:
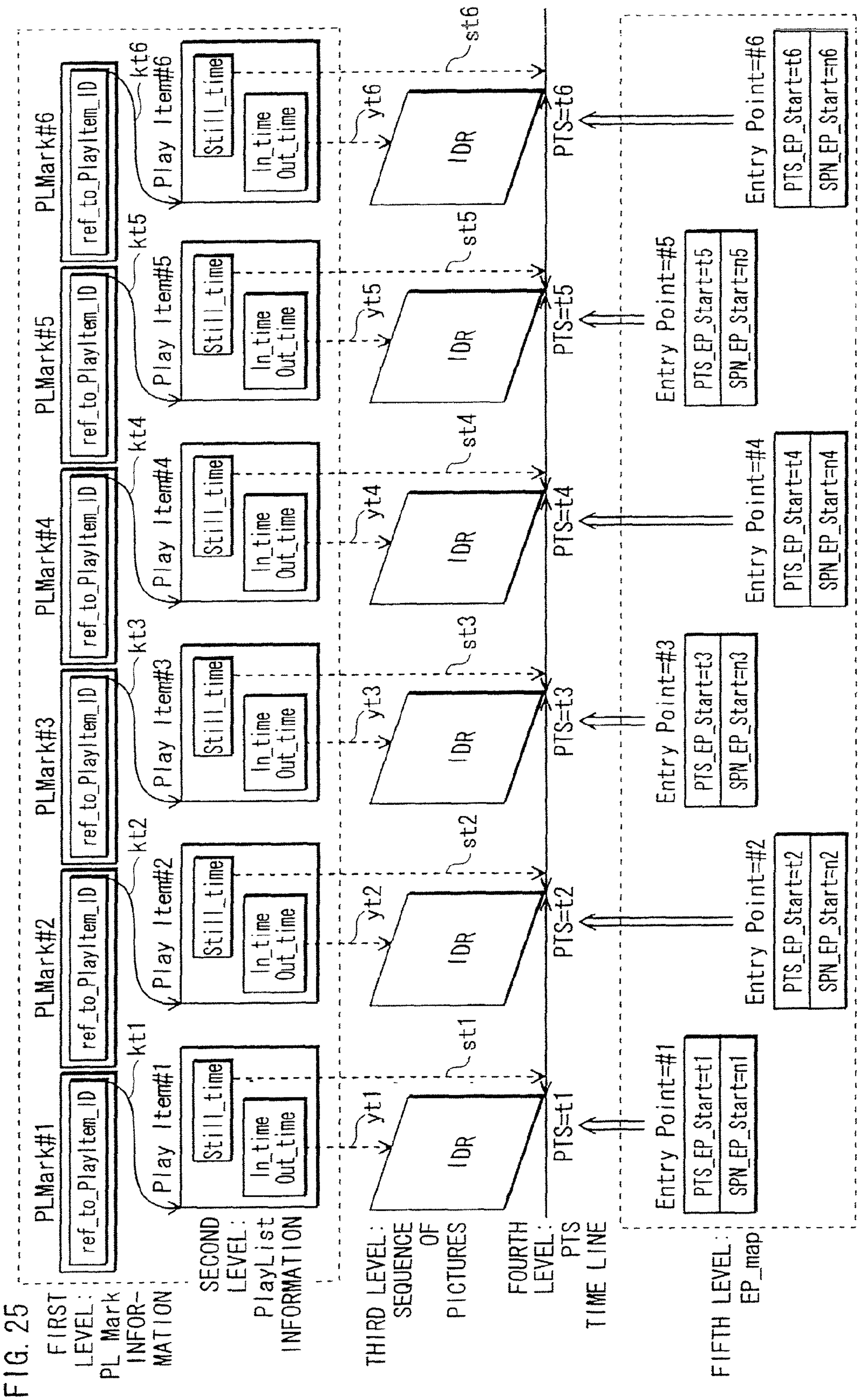
FIG. 25 illustrates a specific example of a setting of PLMark for a video stream used for presenting a slide show.

FIG. 25 shows specification of a slideshow by PlayList information. The second level in the figure indicates PlayItem information. This second level is composed of six pieces of PlayItem information #1 to #6. Arrows yt1, yt2, yt3, yt4, yt5 and yt6 symbolically indicate specification by In_times and Out_times in the PlayItem information, and arrows st1, st2, st3, st4, st5 and st6 symbolically indicate specification by Still_times. As is apparent from these arrows, PlayItem information is configured so as to specify individual pieces of picture data in the video stream. Also, the Still_times are configured so as to indicate a period until display of a subsequent piece of picture data. In this way, the individual pieces of picture data that constitute the slideshow are specified by a respective one of the six pieces of PlayItem information as playback start points and playback end points.

The first level in FIG. 25 indicates PLMark information. In this first level are six pieces of PLMark information #1 to #6. Arrows kt1, kt2, kt3, kt4, kt5 and kt6 indicate specification by ref_to_PlayItem_Id of the PLMark information. As is apparent from these arrows, each ref_to_PlayItem_Id of the PLMark information specifies a piece of PlayItem information.

Next, playback in accordance with PlayItem information is described. Each piece of picture data included in a slide show is pointed by the PlayItem information and the PLMark information. Therefore, the control unit 44 converts the In_time and the Out_time of the PlayItem information to the SPN of the AV Clip, using the EP_map, and supplies the picture data existing in the SPN to the decoder. As a result, the picture data specified by the In_time and the Out_time of the PlayItem information is displayed. After that, the display of the picture is kept for the duration indicated by the Still_Time. The control unit 44 of this embodiment plays back a slide show by repeating the above-described procedure for all the pieces of PlayItem Information.

The chapter search function specifies from among the pieces of PlayItem information, a piece of PlayItem information corresponding to ref_to_PlayItem_Id described in the PLMark information, and performs a random access in the AVClip defined by the specified piece of PlayItem information from a position that is indicated in mark_time_stamp described in the PLMark information. At this time, the control unit 44 specifies from among a plurality of Entry Points, the Entry Point having a PTS_EP_start closest to mark_time_stamp described in the PLMark information, and causes playback to be performed from the Access Unit address corresponding to SPN_EP_start of the specified Entry Point.

The chapter skip specifies a piece of PLMark information that defines a chapter directly before or directly after the chapter at the current playback position, and performs a chapter search to the chapter defined by the specified PLMark information. As described above, the picture specified by the mark_time_stamp of the PLMark information is encoded to be an IDR picture, and the SPN_EP_start of the Entry Point whose is_angle_change_point is "1" indicates the playback time of the IDR picture. Therefore, it is possible to supply the IDR pictures to the video decoder 8 by reading the pictures succeeding the picture at the position indicated by the SPN_EP_start of the Entry Point.

Figure 26:
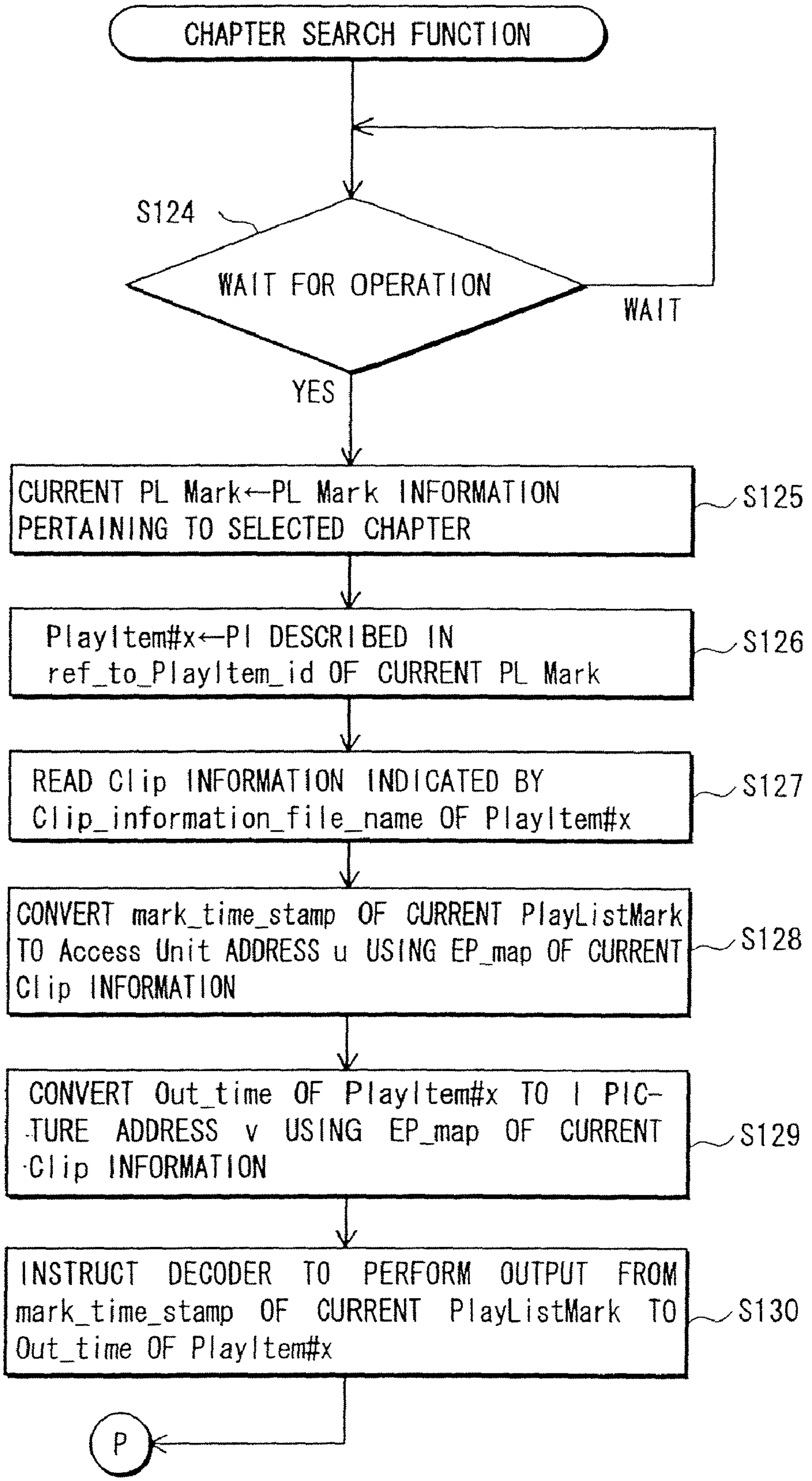
FIG. 26 is a flowchart showing a chapter search processing procedure.

The following describes a chapter search processing procedure and a chapter skip processing procedure. FIG. 26 is a flowchart showing a chapter search processing procedure.

In this flowchart, the control unit 9 first waits for selection of a chapter from a chapter menu (step S124), and, when the chapter selection is performed, sets the PLMark information pertaining to the selected chapter as the current PlayListMark (step S125). In step S126, a PI described in ref_to_PlayItem_Id of the current PlayListMark is set to PlayItem#x, and a piece of Clip information indicated by Clip_information_file_name of the PlayItem#x is read in step S127. In step S128, mark_time_stamp of the current PlayListMark is converted to an Access Unit address u using the EP_map of the current Clip information. Here, the picture indicated by the mark_time_stamp of the PLMark information is indicated by the Entry Point whose is_angle_change_point is "1". Accordingly, the Access Unit address u indicates the address of the IDR picture.

Figure 27:
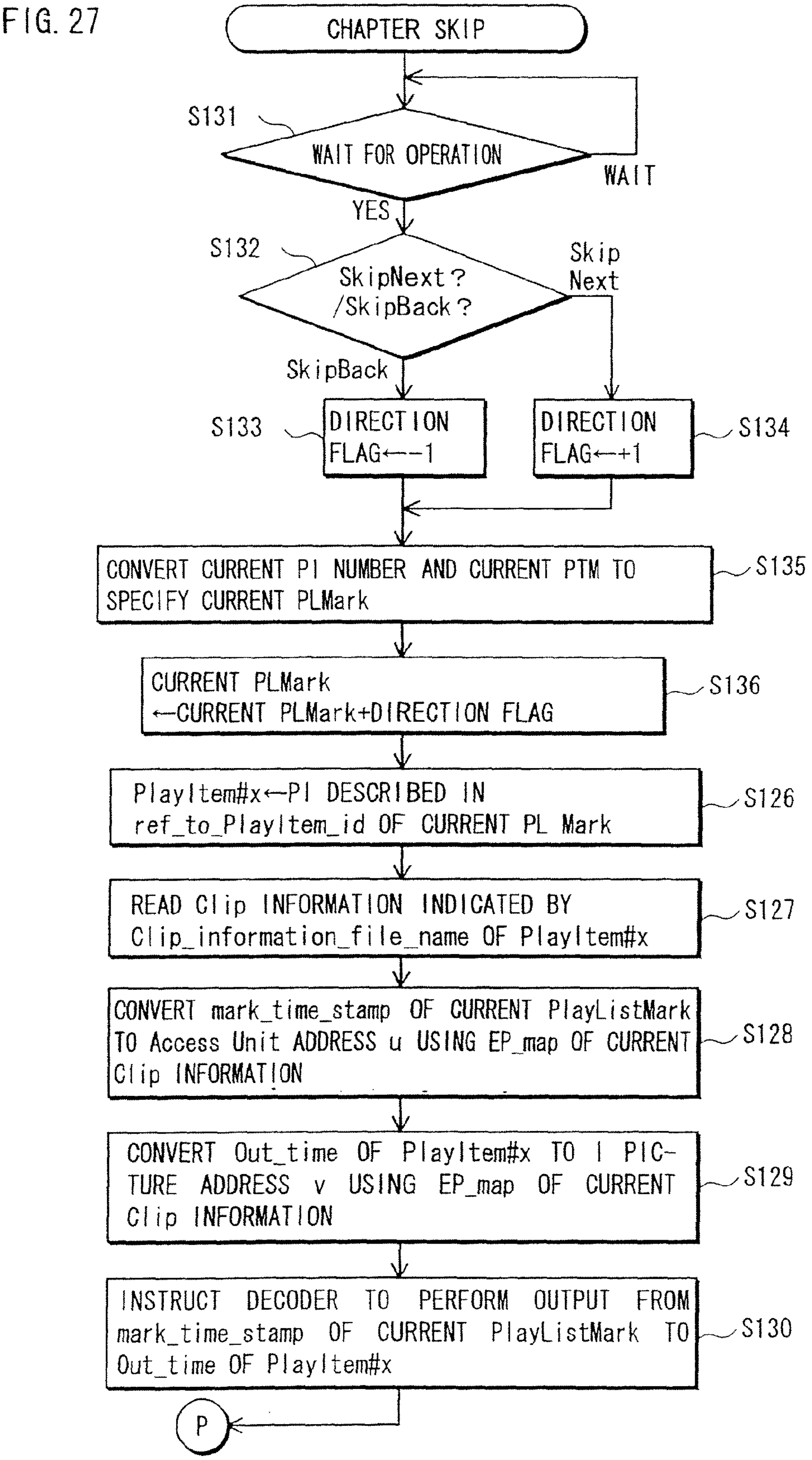
FIG. 27 is a flowchart showing a chapter skip processing procedure.

On the other hand, Out_time of the PlayItem#x is converted to an Access Unit address v in step S129 using the EP_map of the current Clip information. The decoder is instructed in step S130 to output from mark_time_stamp of the current PlayListMark to Out_time of the PlayItem#x. This completes the chapter search processing procedure. Next is a description of a chapter skip processing procedure. FIG. 27 is a flowchart showing the chapter skip processing procedure.

In step S131, the control unit 9 waits for an operation of a SkipNext key or a SkipBack key of the remote control. If the operation is performed, step S132 is executed. In step S132, the control unit 9 judges whether the SkipNext key or the SkipBack key was pressed, and a direction flag is set to −1 in step S133 if the SkipBack key was pressed, and the direction flag is set to +1 in step S134 if the SkipNext key was pressed.

In step 135, a current PI and a current PTM are converted, and a current PLMark is specified. In step S136, a number of the current PLMark is set to the current PLMark number plus a value of the direction flag. If the SkipNext key was pressed, the PLMark is incremented since the direction flag has been set to +1. If the SkipBack key was pressed, the current PLMark is decremented since the direction flag has been set to −1. If the PLMark information is set in this way, reading of TS packets is performed by executing the processing procedure of steps 126 to S130, similarly to FIG. 25.

This concludes the description of the processing procedure performed by the playback device to perform playback in accordance with the PLMark information.

Here, the following describes the case of setting the PLMark for the video stream shown in FIG. 25. The pictures that can be played back in the slide sow are specified by the six PLMarks on the first level, namely PLMark#1 to PLMark#1. Therefore, the still pictures located at the time points t1, t2, t3, t4, t5 and t6 can be targets of the chapter search and the chapter skip.

Also, each of the time points t1, t2, t3, t4, t5 and t6 is specified as PTS_EP_start in the EP_map on the fifth level. Therefore, it is possible to perform random access directly to a desired chapter by the chapter search and the chapter skip, without accessing the preceding IDR picture. To read a desired picture, it is possible to perform the chapter search and the chapter skip without accessing the preceding IDR picture. Therefore, it is possible to perform the chapter search and the chapter skip highly efficiently even in the case of a slide show.

As described above, according to this embodiment, it is possible to perform the chapter search and the chapter skip highly efficiently even in the case of a slide show.

Third Embodiment

Figure 28:
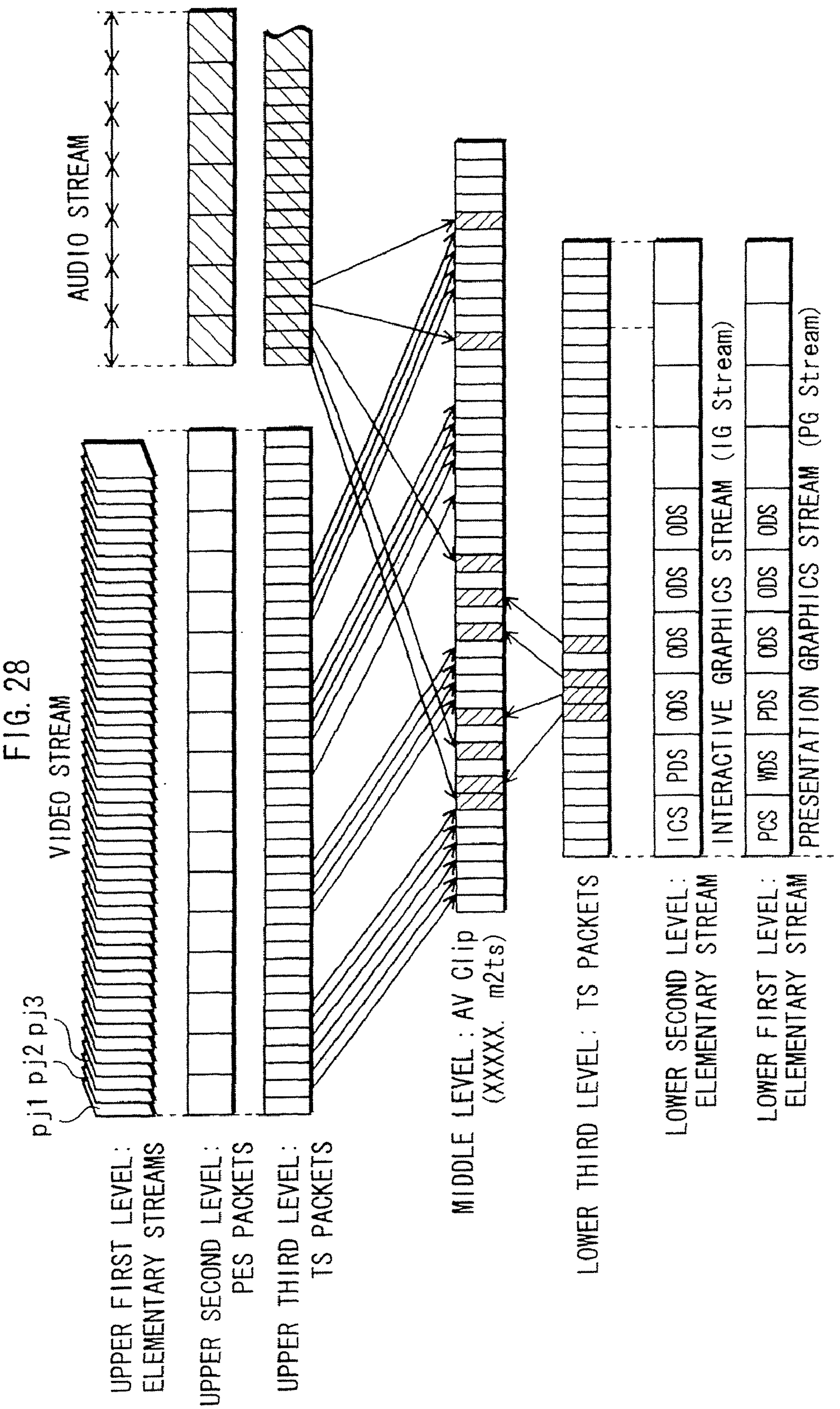
FIG. 28 illustrates the internal structure of AVClip according to the third embodiment.
Figure 29A:
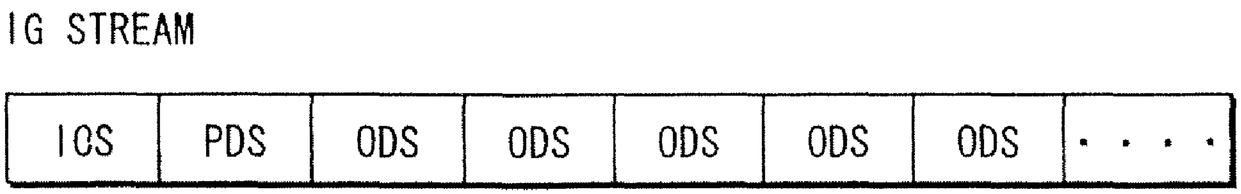
FIG. 29A illustrates the internal structure of an IG stream.

This embodiment is an application of the first embodiment and the second embodiment, and relates to an introduction of an interactive control into the slide show. To introduce such an interactive control, IG stream is multiplexed to form AV Clip, as well as the video stream and the audio stream shown in FIG. 3. FIG. 28 illustrates the structure of AV Clip according to the third embodiment. In this figure, an AV Clip (the middle level) is structured by converting a video stream that includes a plurality of video frames (pictures pj1, pj2, pj3) and an audio stream that includes a plurality of audio frames (the upper first level) into PES packet strings (the upper second level), and further converting the PES packet strings into TS packets (the upper third level), and also converting an interactive graphics stream (IG stream, on the lower second level) into TS packets (the lower third level), and multiplexing the TS packets. FIG. 29 illustrates the internal structure of an IG stream.

An interactive graphics stream includes an ICS (Interactive Composition Segment), a PDS (Palette Definition Segment), an ODS (Object Definition Segment) and an END (END of Display Set Segment).

The ODS (Object Definition Segment) is graphics data that defines the design of a graphic when rendering a button.

The PDS (Palette Definition Segment) is a function segment that defines color when rendering the graphics data.

The ICS (Interactive Composition Segment) is a function segment that defines interactive control which changes button states according to user operation.

Figure 29B:
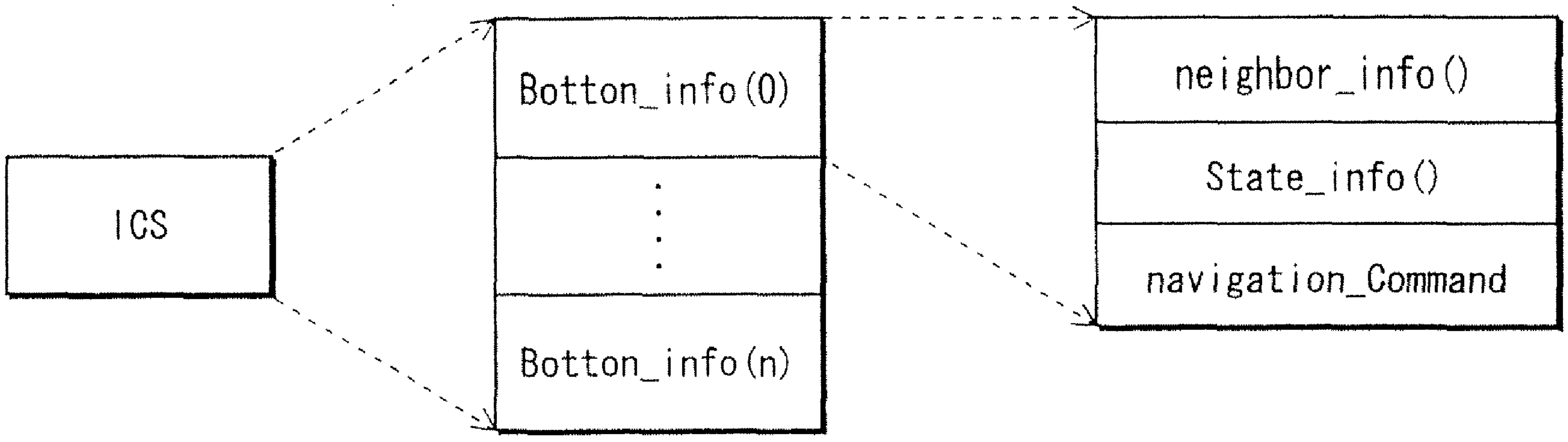
FIG. 29B shows an internal structure of an ICS.

FIG. 29B shows an internal structure of the ICS. The ICS is composed of pieces of button information. The pieces of button information correspond respectively to individual buttons of an interactive control screen. Specifically, the ICS is composed of "neighbor_info" which shows a button to move the focus to if the focus is on a corresponding button and then a move key is pressed, "state_info" that shows which ODS is to be used to display states such as a normal state and selected state of a corresponding button, and "navigation commands" to cause the playback apparatus to perform execution when selection of a corresponding button is confirmed.

The data structure of the above-described IG stream is a summary of content included in the following publicly known document. More detailed technical content can be found in the following document.

International Publication No. WO 2004/077826

The following describes a specific example of an ICS.

Figure 30:
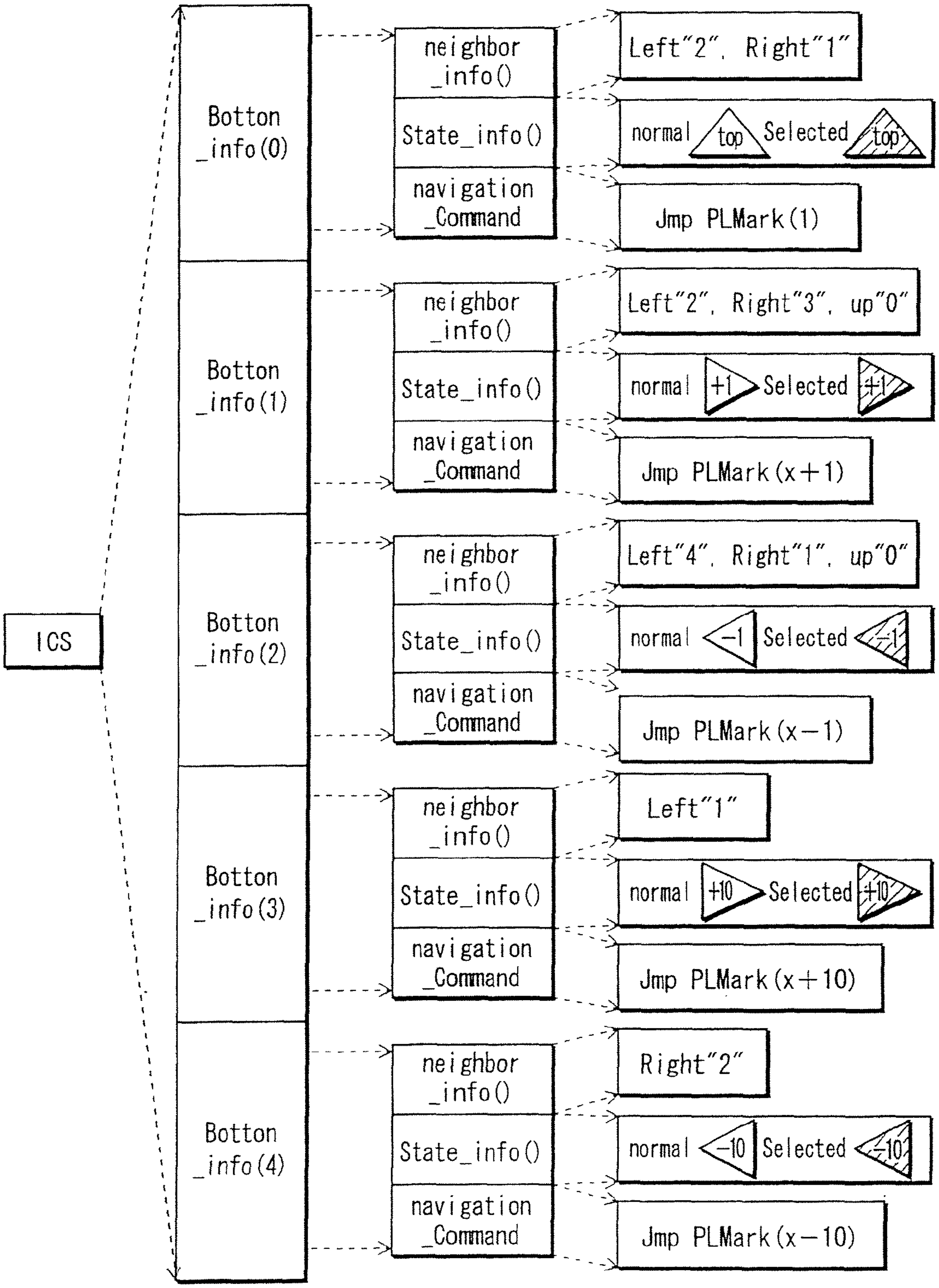
FIG. 30 shows an exemplary ICS that defines interaction control in the slideshow.

Here, the ICS has state_info, neighbor_info and a navigation command configured as shown in FIG. 30. FIG. 30 shows an exemplary ICS that specifies interactive control of the slideshow.

1. State_Info

If a button ("top" button) corresponding to Button_info(0) is in a normal state, state_info of Button_info(0) is specified such that a triangular graphic with "top" is rendered on the screen. Also, the state_info is specified such that the triangular graphic with "top" is rendered in an emphasized state if focus is on the "top" button (in a selected state). As a result of this specification, the "top" button can be handled as a button for skipping to the first still image.

If a button ("+1" button) corresponding to Button_info(1) is in the normal state, state_info of Button_info(1) is specified such that a triangular graphic with "+1" is rendered on the screen. Also, the state_info of Button_info(1) is specified such that the triangular graphic with "+1" is rendered in an emphasized state if the "+1" button is in the selected state. As a result of this specification, the "+1" button can be handled as a button for skipping to the next still image.

If a button ("−1" button) corresponding to Button_info(2) is in the normal state, state_info of Button_info(2) is specified such that a triangular graphic with "−1" is rendered on the screen. Also, the state_info of Button_info(2) is specified such that the triangular graphic with "−1" is rendered in an emphasized state if the "−1" button is in the selected state. As a result of this specification, the "−1" button can be handled as a button for skipping to the previous still image.

If a button ("+10" button) corresponding to Button_info(3) is in the normal state, state_info of Button_info(3) is specified such that a triangular graphic with "+10" is rendered on the screen. Also, the state_info of Button_info(3) is specified such that the triangular graphic with "+10" is rendered in an emphasized state if the "+10" button is in the selected state. As a result of this specification, the "+10" button can be handled as a button for skipping to the 10th still image from the still image currently displayed.

If a button ("−10" button) corresponding to Button_info(4) is in the normal state, state_info of Button_info(4) is specified such that a triangular graphic with "−10" is rendered on the screen. Also, the state_info of Button_info(4) is specified such that the triangular graphic with "−10" is rendered in an emphasized state if the "−10" button is in the selected state. As a result of this specification, the "−10" button can be handled as a button for skipping back 10 frames.

Figures 31A, 31B, 31C:
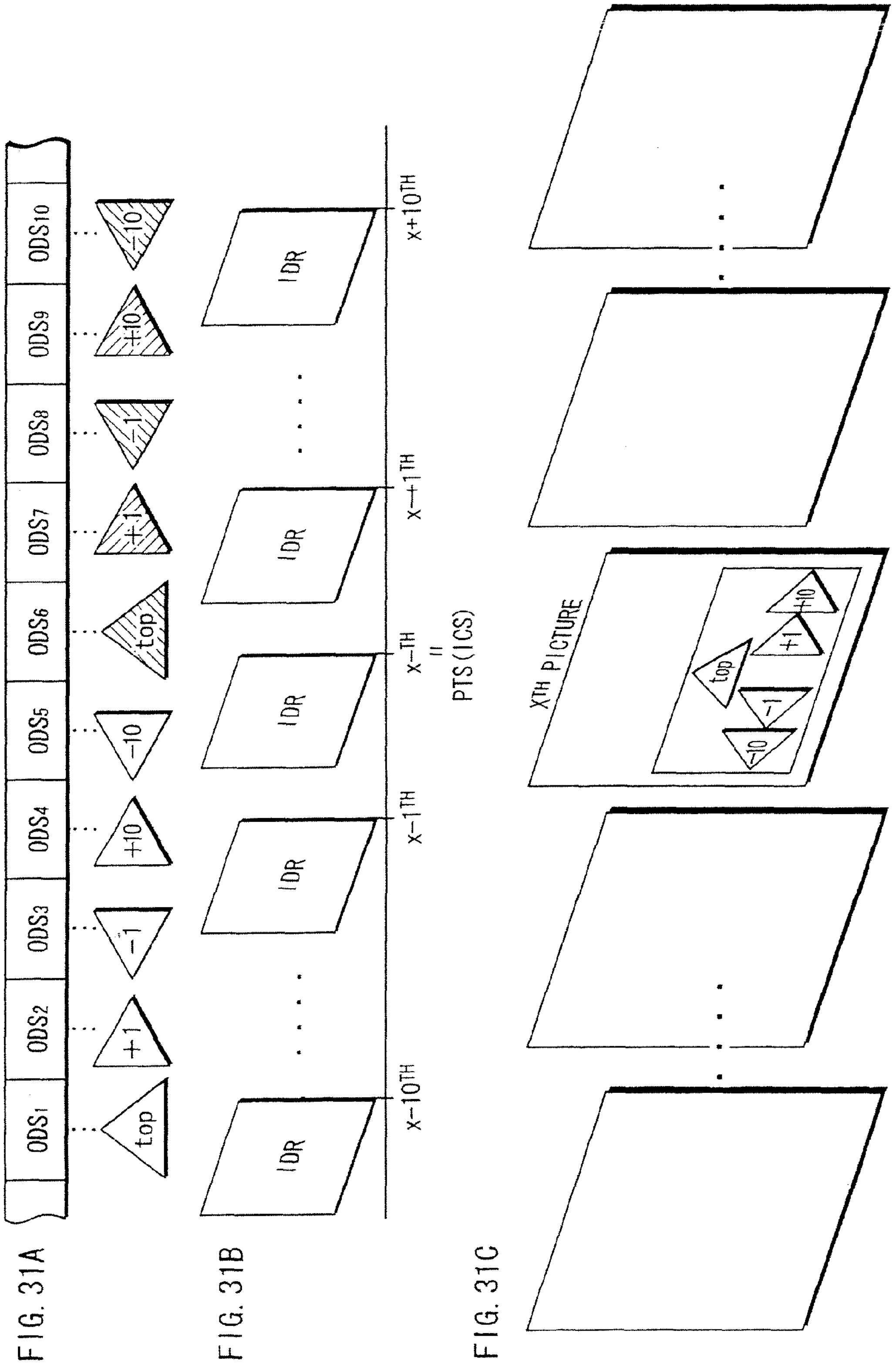
FIGS. 31A to 31C show a menu that is displayed when a playback point of a video stream reaches a point tx.

As shown in FIG. 31A, the graphics specified by state_info of the buttons from the "top" button to the "−10" button are included in the ODSs of the IG stream. State_info is configured with this kind of content, and a PTS indicates a point tx on a time-axis at which an xth picture is to be displayed, as shown in FIG. 31B. As a result of this, a menu as shown in FIG. 31C is displayed in combination with the xth still image when the playback point of the video stream reaches the point tx.

2. Neighbor_Info of an ICS

The following references neighbor_info of each object B in FIG. 30.

Neighbor_info of Button_info(0) is specified such that the focus is moved to the "−1" button having the number "2" when a left key is pressed, and to the "+1" button having the number "1" when a right key is pressed.

Neighbor_info of Button_info(1) is specified such that the focus is moved to the "top" button having the number "0" when an up key is pressed, to the "−1" button having the number "2" when the left key is pressed, and to the "+10" button having the number "3" when the right key is pressed.

Neighbor_info of Button_info(2) is specified such that the focus is moved to the "−10" button having the number "4" when the left key is pressed, to the "+1" button having the number "1" when the right key is pressed, and to the "top" button having the number "0" when the up key is pressed.

Neighbor_info of Button_info(3) is specified such that the focus is moved to the "+1" button having the number "1" when the left key is pressed.

Neighbor_info of Button_info(4) is specified such that the focus is moved to the "−1" button having the number "2" when the right key is pressed.

Figure 32:
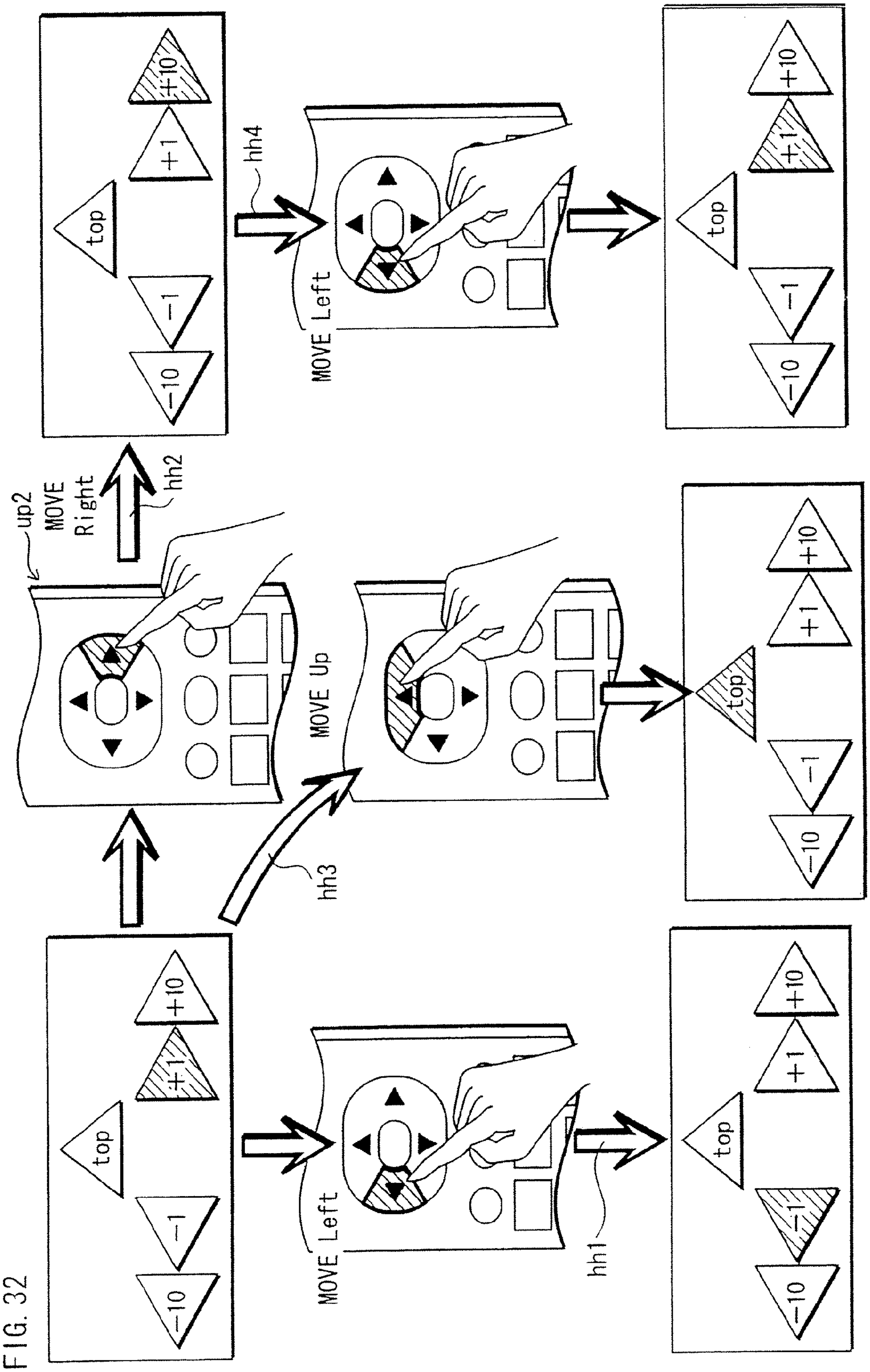
FIG. 32 shows a state transition in a menu displayed in the slideshow.
Figure 33:
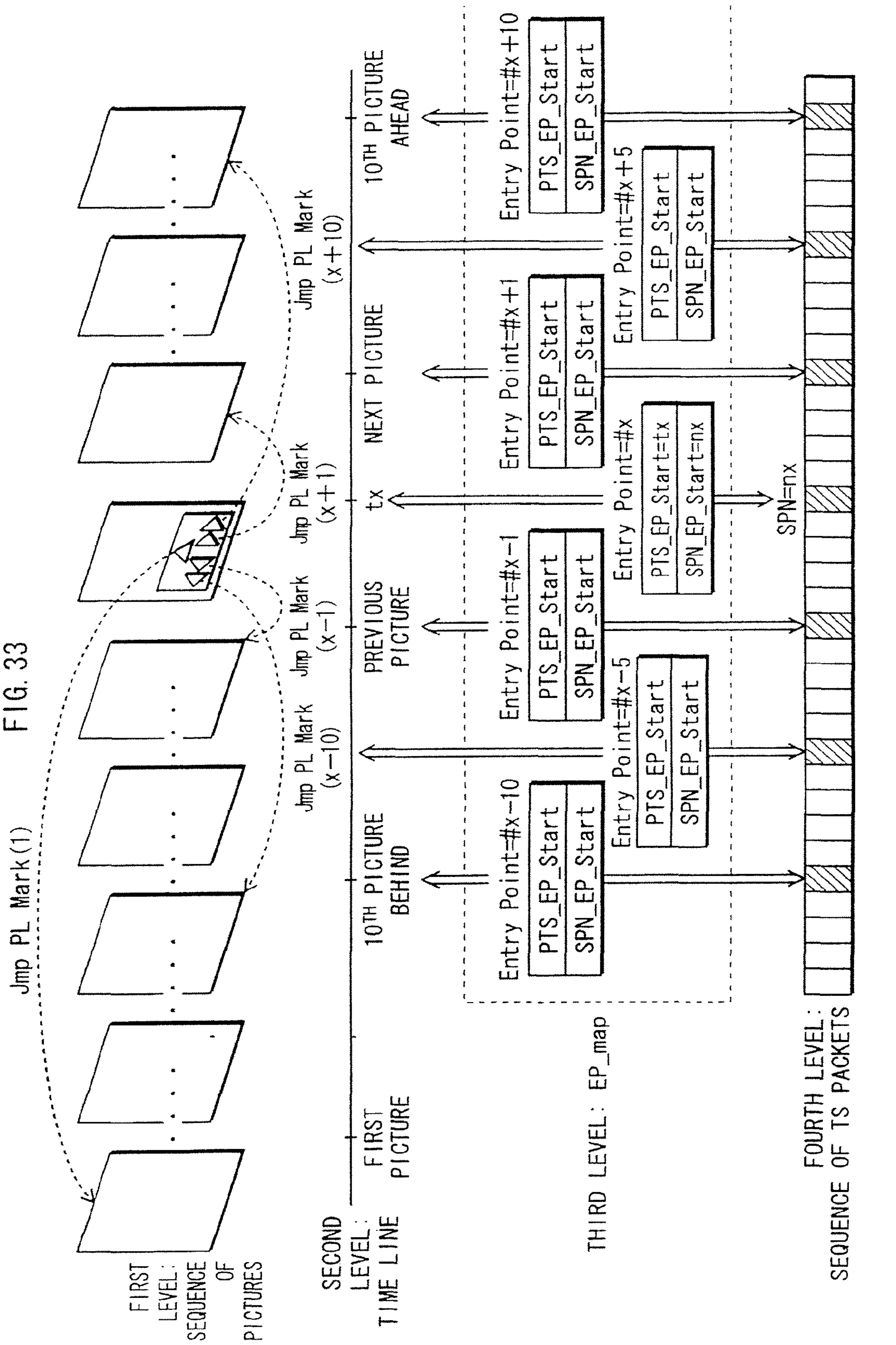
FIG. 33 shows a branch resulting from a navigation command of the slideshow.

The above specifications of neighbor_info enable the realization of state transitions as shown in FIG. 32. FIG. 32 shows state transitions of a menu displayed in the slideshow.

Specifically, if the left key is pressed while the focus is on the "+1" button, the focus can be moved to the "−1" button (hh1).

If the right key is pressed while the focus is on the "+1" button, the focus can be moved to the "+10" button (hh2). Furthermore, if the left key is pressed while the focus is on the "+10" button, the focus can be returned to the "+1" button (hh4). If the up key is pressed while the focus is on the "+1" button, the focus can be moved to the "top" button (hh3).

As mentioned above, the "top" button, "+1" button, "−1" button, "+10" button and "−10" button are respectively for skipping to the beginning, next picture, previous picture, 10 pictures ahead and 10 pictures behind. Given that the focus moves in accordance with a user press of the up, down, left and right keys when these buttons are displayed, the user can make an arbitrary one of the "+1" to "−10" buttons a selection target.

3. Navigation Commands of an ICS

The navigation command of Button_info(0) is specified such that Jmp PLMark(1) is executed if a determination operation is performed on the "top" button.

The navigation command of Button_info(1) is specified such that Jmp PLMark(x+1) is executed if the determination operation is performed on the "+1" button.

The navigation command of Button_info(2) is specified such that Jmp PLMark(x−1) is executed if the determination operation is performed on the "−1" button.

The navigation command of Button_info(3) is specified such that Jmp PLMark(x+10) is executed if the determination operation is performed on the "+10" button.

These navigation commands designate a PLMark as a branch destination. The number value inside the parentheses pertaining to the PLMark designates a picture as the branch destination. In other words, PLMark(1) is a PLMark indicating the first picture. PLMark(x+1) is a PLMark indicating the picture corresponding to x−1. PLMark(x+10) is a PLMark indicating a picture corresponding to x+10. PLMark(x−10) is a PLMark indicating a picture corresponding to x−10.

The navigation commands of the button information designate PLMark(1), PLMark(x+1), PLMark(x−1), PLMark (x+10), PLMark(x−10) as branch destinations, thereby enabling random access to, with respect to the xth still picture, the first still picture, x+1th still picture, x−1th still picture, x+10th still picture, and x−10th still picture when a button is selected.

Given that the focus can be moved to an arbitrary button as a result of the focus movement shown in FIG. 30, the user can perform the determination operation while the focus is on any of the buttons to cause the playback apparatus to execute the navigation command corresponding to the selected button, thereby enabling the execution of the branching as shown in FIG. 32. FIG. 32 shows branching as a result of navigation commands of the slideshow. The first level of this figure shows a plurality of pictures that constitute the slideshow, and branches to these pictures. The second level is the time-axis of the slideshow, the third level is an entry map configured with respect to the picture string of the second level, and the fourth level shows a TS packet string on the BD-ROM.

Arrows of the first level in the figure symbolically show branches resulting from the navigation commands (JmpPLMark(1), JmpPLMark(x+1), JmpPLMark(x−1), JmpPLMark (x+10), JmpPLMark(x−10)) shown in FIG. 30. As a result of these branches, the first still picture, the next still picture, the previous still picture, 10th still picture ahead, or 10th still picture behind is played back. These branches are based on the navigation commands shown in FIG. 30, thereby enabling an arbitrary still picture to be played back by user operation.

Here, if each of the playback points of the first still picture, the next still picture, the previous still picture, the 10th still picture ahead, and the 10th still picture behind is specified as PTS_EP_start in EP_map, it is possible to perform random access to a desired access point without analyzing the stream. Since it is possible to perform an interactive playback operation using navigation commands to read a desired picture, the interactive playback operation becomes highly efficient.

Remarks

The above description by no means shows the implementation of all configurations of the present invention. Implementation of the present invention is still possible according to implementation of configurations that carry out the following modifications (A), (B), (C, (D), . . . . The inventions pertaining to the claims of the present application range from expanded disclosure to generalized disclosure of the plurality of embodiments disclosed above and the modified configurations thereof. The degree of expansion or generalization is based on the particular characteristics of technical standards in the technical field of the present invention at the time of the application.

(A) Although a recording medium pertaining to the present invention is implemented as a BD-ROM in all of the embodiments, the recording medium of the present invention is characterized by the recorded EP_map, and this characteristic is not dependent on the physical properties of a BD-ROM. Any form of recording media is applicable as long as there exists the capacity to record an EP_map. For example, optical disks such as DVD-ROM, DVD-RAM, DVD-RW, DVD-R, DVD+RW, DVD+R, CD-R, CD-RW and the like, and optical-magnetic disks such as PD, MO and the like are applicable. Semiconductor cards such as a CompactFlash card (registered trademark), a SmartMedia card, a Memory Stick, a MultiMedia card, a PCM-CIA card and the like are also applicable, as well as (i) magnetic recording disks such as a flexible disk, SuperDisk, Zip, Clik! and the like, and (ii) removable hard disk drives such as ORB, Jaz, SparQ, SyJet, EZFley, microdrive and the like. Furthermore, the recording medium may also be a built-in hard disk.

(B) Although the playback apparatuses in all of the embodiments output AVClips recorded on a BD-ROM to a TV after decoding, the playback apparatus may be structured from only a BD-ROM drive, and the TV may be equipped with all of the other elements. In this case, the playback apparatus and the TV can be incorporated into a home network connected using IEEE1394. Also, although the playback apparatuses in the embodiments are of a type used after connecting to a television, integral display-playback apparatuses are also applicable. Furthermore, the playback apparatus may be only a system LSI (integrated circuit) that performs essential parts of the processing in the playback apparatuses of the embodiments.

(C) Because of the information processing by a computer program shown in each of the flowcharts being realized specifically using hardware resources, a computer program showing the processing procedures in the flowchart forms an invention in its own right. Although all of the embodiments show embodiments that relate to the implementation of computer programs pertaining to the present invention in an incorporated form in the playback apparatuses, the computer programs shown in the first to third embodiments may be implemented in their own right, separate from the playback apparatuses. The implementation of the computer programs in their own right includes acts that involve: (1) production of the programs, (2) transference of the programs, either gratuitous or otherwise, (3) lending of the programs, (4) importing of the programs, (5) providing the programs publicly via bi-directional electronic communications circuits, and (6) approaching the general user about transfer, rental and the like by means of show-window displays, catalogue solicitation, pamphlet distribution, and so forth.

(D) Although digital streams in the embodiments are AVClips complying with a BD-ROM standard, the digital streams may be VOBs (Video Objects) complying with a DVD-Video standard or a DVD-Video Recording standard. VOBs are program streams compliant with ISO/IEC13818-1 obtained by multiplexing video and audio streams. Also, video streams in AVClips may be MPEG-4 format, WMV format, or the like. Furthermore, audio streams may be a Linear-PCM format, Dolby-AC3 format, MP3 format, MPEG-AAC format, or dts format.

(E) In the first embodiment, the slide show is described as the TS for Timebased SlidShow. However, the slide show may AVClip used for TS for MainPath of the Browsable SlideShow, or AVClip used for SubPath of the Browsable SlideShow. In other words, it is acceptable to set the EP_map in the Clip information corresponding to the AV Clip used for TS for MainPath of the Browsable SlideShow, to indicate the playback point and the recording position of each picture.

(F) Each of the embodiments above is described based on the MPEG4-AVC (also referred as H.264 or JVT). However, the MPEG2 video stream may be used. Also, any other picture format (VC-1) is easily applicable as long as the picture can be decoded independently.

INDUSTRIAL APPLICABILITY

A recording medium and a playback apparatus of the present invention may be used personally as in a home theater system. However, the recording medium and the playback apparatus of the present invention may be produced and used in the industrial production field since the internal structure thereof is disclosed in the embodiments described above, and it is apparent that the playback apparatus of the present invention will be mass-produced. For this reason, the recording medium and the playback apparatus of the present invention have industrial applicability.

The invention claimed is:

1. A non-transitory recording medium having recorded thereon a video stream and stream management information, wherein the video stream includes a plurality of pieces of picture data, each picture data piece in the video stream has a variable code length and has been converted into an access unit, the access unit having a plurality of Network Abstraction Layer (NAL) units, among the plurality of NAL units, a first NAL unit includes an access unit delimiter, the stream management information includes an entry map and a flag that indicates one of application types, the entry map indicates an entry address of each piece of picture data in correspondence with a playback start time thereof, the application types include a movie and a time-based slideshow, if a value indicating the time-based slideshow has been set to the flag, all the pieces of picture data are respectively pointed to by entries included in the entry map, if a value indicating the movie has been set to the flag, intra pictures among the pieces of picture data are respectively pointed to by the entries included in the entry map, the intra pictures each located at a head of a GOP, a rate of entries in the entry map for pointing to the picture data in the video stream is higher when the value indicating the time-based slideshow has been set to the flag than when the value indicating the movie has been set to the flag, the rate of entries being a number of entries per frames in the video stream, and when the value indicating the time-based slideshow has been set to the flag, all pictures constituting the time-based slideshow in the video stream are encoded as IDR pictures.

2. The non-transitory recording medium according to claim 1, wherein:

the video stream is in an MPEG4-AVC format and is recorded in a form of TS packets having a fixed length, and among the TS packets, a TS packet including an access unit delimiter does not include an end portion of a picture data piece that is immediately before the TS packet in the video stream.

3. A playback device that reads stream management information from a recording medium and plays back, based on the stream management information, a video stream recorded on the recording medium, wherein the video stream includes a plurality of pieces of picture data, each picture data piece in the video stream has a variable code length and has been converted into an access unit, the access unit having a plurality of Network Abstraction Layer (NAL) units, among the plurality of NAL units, a first NAL unit includes an access unit delimiter, the stream management information includes an entry map and a flag that indicates one of application types, the entry map indicates an entry address of each piece of picture data, which is included in the video stream, in correspondence with a playback start time thereof, the application types include a movie and a time-based slideshow, if a value indicating the time-based slideshow has been set to the flag, all the pieces of picture data are respectively pointed to by entries included in the entry map, if a value indicating the movie has been set to the flag, intra pictures among the pieces of picture data are respectively pointed to by the entries included in the entry map, the intra pictures each located at a head of a GOP, a rate of entries in the entry map for pointing to the picture data in the video stream is higher when the value indicating the time-based slideshow has been set to the flag than when the value indicating the movie has been set to the flag, the rate of entries being a number of entries per frames in the video stream, and when the value indicating the time-based slideshow has been set to the flag, all pictures constituting the time-based slideshow in the video stream are encoded as IDR pictures, and the playback device comprises:

a read unit operable to read the pieces of picture data from the recording medium;

a playback unit operable to play back the pieces of picture data by decoding each piece of the picture data; and a control unit operable, if the value indicating the time-based slideshow has been set to the flag, to control the read unit and the playback unit to start the playback or change a start position of the playback based on a designation of a playback start time, with reference to the entry map.

4. A recording method comprising:

generating volume data; and recording the volume data on a recording medium;

wherein:

the volume data includes a video stream and stream management information, the video stream includes a plurality of pieces of picture data, each picture data piece in the video stream has a variable code length and has been converted into an access unit, the access unit having a plurality of Network Abstraction Layer (NAL) units, among the plurality of NAL units, a first NAL unit includes an access unit delimiter, the stream management information includes an entry map and a flag that indicates one of application types, the entry map indicates an entry address of each piece of picture data in correspondence with a playback start time thereof, the application types include a movie and a time-based slideshow, if a value indicating the time-based slideshow has been set to the flag, all the pieces of picture data are respectively pointed to by entries included in the entry map, if a value indicating the movie has been set to the flag, intra pictures among the pieces of picture data are respectively pointed to by the entries included in the entry map, the intra pictures each located at a head of a GOP, a rate of entries in the entry map for pointing to the picture data in the video stream is higher when the value indicating the time-based slideshow has been set to the flag than when the value indicating the movie has been set to the flag, the rate of entries being a number of entries per frames in the video stream, and when the value indicating the time-based slideshow has been set to the flag, all pictures constituting the time-based slideshow in the video stream are encoded as IDR pictures.

5. A playback method for reading stream management information from a recording medium and playing back, based on the stream management information, a video stream recorded on the recording medium, wherein the video stream includes a plurality of pieces of picture data, each picture data piece in the video stream has a variable code length and has been converted into an access unit, the access unit having a plurality of Network Abstraction Layer (NAL) units, among the plurality of NAL units, a first NAL unit includes an access unit delimiter, the stream management information includes an entry map and a flag that indicate one of application types, the entry map indicates an entry address of each piece of picture data, which is included in the video stream, in correspondence with a playback start time thereof, the application types include a movie and a time-based slideshow, if a value indicating the time-based slideshow has been set to the flag, all the pieces of picture data are respectively pointed to by entries included in the entry map, if a value indicating the movie has been set to the flag, intra pictures among the pieces of picture data are respectively pointed to by the entries included in the entry map, the intra pictures each located at a head of a GOP, a rate of entries in the entry map for pointing to the picture data in the video stream is higher when the value indicating the time-based slideshow has been set to the flag than when the value indicating the movie has been set to the flag, the rate of entries being a number of entries per frames in the video stream, and when the value indicating the time-based slideshow has been set to the flag, all pictures constituting the time-based slideshow in the video stream are encoded as IDR pictures, and the playback method comprises:

reading the pieces of picture data from the recording medium;

playing back the pieces of picture data by decoding each piece of the picture data; and if the value indicating the time-based slideshow has been set to the flag, controlling the reading and the playing back to start the playback or change a start position of the playback based on a designation of a playback start time, with reference to the entry map.

6. A computer-executable program recorded on a non-transitory recording medium for causing a computer to perform processing for reading stream management information from a recording medium and playing back, based on the stream management information, a video stream recorded on the recording medium, wherein the video stream includes a plurality of pieces of picture data, each picture data piece in the video stream has a variable code length and has been converted into an access unit, the access unit having a plurality of Network Abstraction Layer (NAL) units, among the plurality of NAL units, a first NAL unit includes an access unit delimiter, the stream management information includes an entry map and a flag that indicate one of application types, the entry map indicates an entry address of each piece of picture data, which is included in the video stream, in correspondence with a playback start time thereof, the application types include a movie and a time-based slideshow, if a value indicating the time-based slideshow has been set to the flag, all the pieces of picture data are respectively pointed to by entries included in the entry map, if a value indicating the movie has been set to the flag, intra pictures among the pieces of picture data are respectively pointed to by the entries included in the entry map, the intra pictures each located at a head of a GOP, a rate of entries in the entry map for pointing to the picture data in the video stream is higher when the value indicating the time-based slideshow has been set to the flag than when the value indicating the movie has been set to the flag, the rate of entries being a number of entries per frames in the video stream, and when the value indicating the time-based slideshow has been set to the flag, all pictures constituting the time-based slideshow in the video stream are encoded as IDR pictures, and the processing comprises:

reading the pieces of picture data from the recording medium;

playing back the pieces of picture data by decoding each piece of the picture data; and if the value indicating the time-based slideshow has been set to the flag, controlling the reading and the playing back to start the playback or change a start position of the playback based on a designation of a playback start time, with reference to the entry map.

* * * * *